United States Patent
Omata

(10) Patent No.: US 8,625,155 B2
(45) Date of Patent: Jan. 7, 2014

(54) IMAGE FORMING SYSTEM, CONTROLLING APPARATUS, AND RECORDING MEDIUM HAVING PROGRAM RECORDED THEREIN

(75) Inventor: Haruhiko Omata, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 1052 days.

(21) Appl. No.: 12/428,843

(22) Filed: Apr. 23, 2009

(65) Prior Publication Data

US 2009/0273811 A1    Nov. 5, 2009

(30) Foreign Application Priority Data

May 1, 2008    (JP) .................................. 2008-119506
Mar. 31, 2009    (JP) .................................. 2009-085227

(51) Int. Cl.
*G06F 15/00*    (2006.01)
*G03G 15/20*    (2006.01)

(52) U.S. Cl.
USPC .......................................... 358/1.9; 399/341

(58) Field of Classification Search
USPC ................................. 347/155; 358/1.9, 3.01
See application file for complete search history.

(56) References Cited

U.S. PATENT DOCUMENTS

| 5,091,743 A * | 2/1992 | Nagata et al. .................. 355/401 |
| 7,180,631 B2 | 2/2007 | Ide et al. |
| 7,321,449 B2 | 1/2008 | Ide et al. |
| 7,383,011 B2 | 6/2008 | Omata |
| 7,421,231 B2 | 9/2008 | Bessho |
| 2004/0081489 A1* | 4/2004 | Noya et al. ..................... 399/328 |
| 2007/0297839 A1 | 12/2007 | Omata |

FOREIGN PATENT DOCUMENTS

| JP | 5-265287 A | 10/1993 |
| JP | 2002-341619 A | 11/2002 |
| JP | 2006-243209 A | 9/2006 |

* cited by examiner

*Primary Examiner* — Benny Q Tieu
*Assistant Examiner* — Sunil Chacko
(74) *Attorney, Agent, or Firm* — Fitzpatrick, Cella, Harper & Scinto

(57) ABSTRACT

An image forming system includes an image forming device configured to form an image on a recording material using a color toner and a transparent toner, a fixing device, a glossing device that has a conveying device which conveys the recording material, a heating device heating the recording material, and a cooling device cooling the recording material, and a controller controlling said image forming device so that an amount of the transparent toner per unit area on the recording material in a first image forming mode in which the image is formed using said fixing device and said glossing device is smaller than the amount of the transparent toner per unit area on the recording material in a second image forming mode in which the image is formed using said fixing device without using said glossing device.

10 Claims, 17 Drawing Sheets

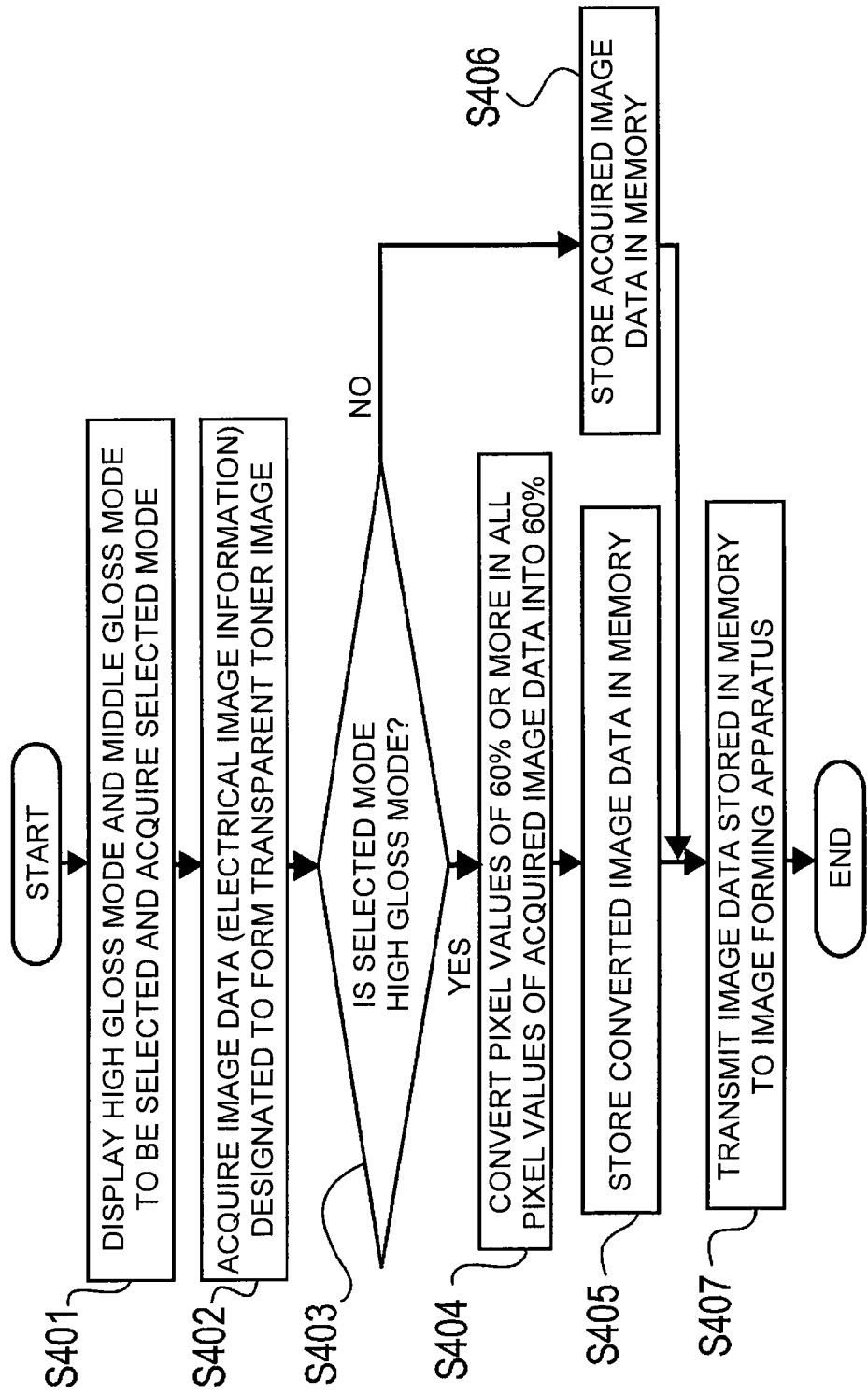

IMAGE FORMING SYSTEM, CONTROLLING APPARATUS, AND RECORDING MEDIUM HAVING PROGRAM RECORDED THEREIN

BACKGROUND OF THE INVENTION

1. Field of the Invention

The present invention relates to an image forming system that forms a color toner image and a transparent toner image on a recording material, a controlling apparatus that controls the image forming system, and a recording medium that has a program recorded therein.

2. Description of the Related Art

In recent years, in order to increase a gloss of an image, image forming apparatuses using a transparent toner have been suggested. For example, Japanese Patent Application Laid-Open No. 2006-243209 discloses an image forming apparatus where a transparent toner image is formed to overlap a color toner image on a recording material, thereby forming an image having a high gloss. A fixer of the image forming apparatus includes a pair of fixing rollers that include heaters. In a heating nip portion that is formed by the pair of fixing rollers, a toner image on the recording material is fixed to the recording material. This fixing system is called a high temperature separation system.

Further, Japanese Patent Application Laid-Open No. 2002-341619 discloses an image forming apparatus where a transparent toner image is formed to overlap a color toner image on a recording material, thereby forming an image having a high gloss. A fixer of the image forming apparatus heats a toner image on the recording material with a fixing belt having a smooth surface, and separates the cooled recording material from the fixing belt in a state where the recording material closely adheres to the fixing belt. This fixer is called a fixer of a cooling separation system. In the fixer of the cooling separation system, the toner image is solidified in a state where the toner image closely adheres to a surface of the fixing belt. As a result, a surface of the toner image is smoothened like the surface of the fixing belt.

In this case, in order to adjust a gloss of a printed material, an image forming system that has a fixer of a high temperature separation system and a fixer of a cooling separation system is assumed. In this image forming system, in order to adjust a gloss of an image, a mode where an image is fixed using the fixer of the high temperature separation system and a mode where an image is fixed using the fixer of the cooling separation system are considered. When the gloss of the image is increased using the fixer of the high temperature separation system, a transparent toner of the predetermined amount per unit area is loaded to the recording material. In the same way, when the gloss of the image is increased using the fixer of the cooling separation system, if a transparent toner of the same amount per unit area as that in the case where the gloss of the image is increased using the fixer of the high temperature separation system is loaded, a crack may be easily generated in the surface of the image.

The reason why the crack is generated is as follows. If the recording material is heated, moisture is evaporated and the recording material is contracted. Further, if the recording material is cooled down after being heated, the recording material absorbs moisture and is expanded. Meanwhile, if a toner is heated, the toner is expanded while being softened. Further, if the toner is cooled down, the toner is contracted while being solidified. For this reason, in the high temperature separation system, since the toner whose viscosity is lowered is gradually solidified along the expanded recording material, it is difficult for a crack to be generated in the toner image.

Meanwhile, in the cooling separation system, since the toner is rapidly cooled down, the toner is solidified in a state where strong stress remains in the toner. Thereafter, due to the expansion of the recording material, the crack may be easily generated in the toner image.

SUMMARY OF THE INVENTION

Accordingly, the present invention provides an image forming system that can increase a gloss of an image using first heating device for separating a recording material after heating a toner image on the recording material formed by image forming device using a first nip portion, and suppress generation of a crack using second heating device configured to separate the recording material at a temperature lower than a temperature of when the recording material is separated from a first nip portion of the first heating device after heating the toner image on the recording material formed by the image forming device by the second nip portion, while improving a gloss of the image.

An image forming system according to an embodiment of the present invention includes image forming device configured to form an image on a recording material using a color toner and a transparent toner; fixing device configured to fix the image formed by the image forming device to the recording material; glossing device that has a conveying device, which contacts the recording material where the image is fixed by the fixing device with the image and conveys the recording material, heating device configured to heat the recording material on the conveying device, and cooling device configured to cool down the recording material on the conveying device heated by the heating device before separating the recording material from the conveying device, and increases a gloss of the image fixed to the recording material by the fixing device; and controller for controlling the image forming device, such that the amount of the transparent toner per unit area on the recording material in a first image forming mode where an image is formed using the glossing device becomes smaller than the amount of the transparent toner per unit area on the recording material in a second image forming mode where an image is formed using only the fixing device without using the glossing device.

Further features of the present invention will become apparent from the following description of exemplary embodiments with reference to the attached drawings.

BRIEF DESCRIPTION OF THE DRAWINGS

FIG. 17 is a flowchart illustrating a program that a PC executes in accordance with an embodiment of the present invention.

DESCRIPTION OF THE EMBODIMENTS

First Embodiment (1) Image Forming Station

Figure 1:
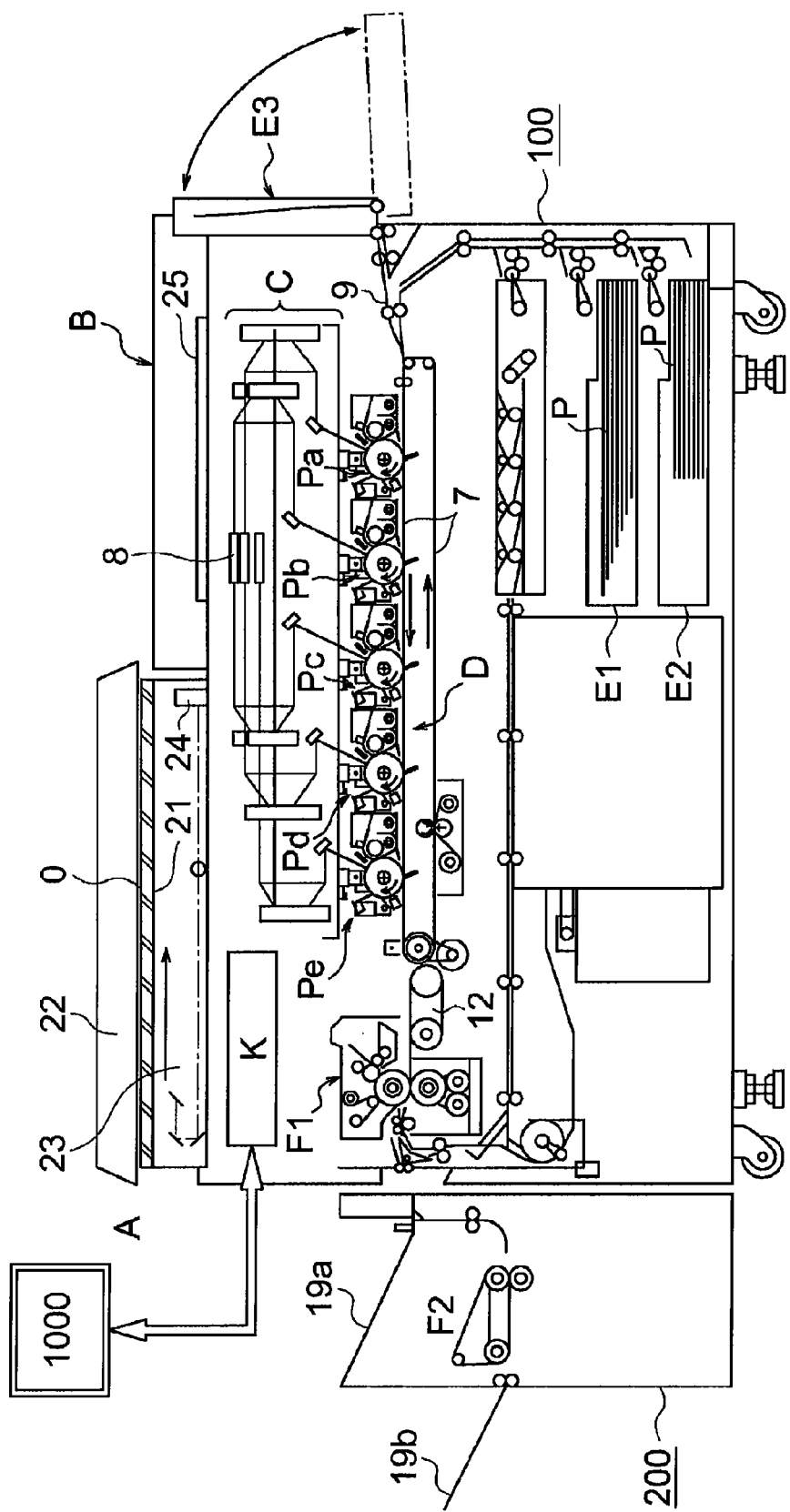
FIG. 1 is a diagram illustrating the schematic configuration of an image forming apparatus according to an embodiment of the present invention.
Figure 2:
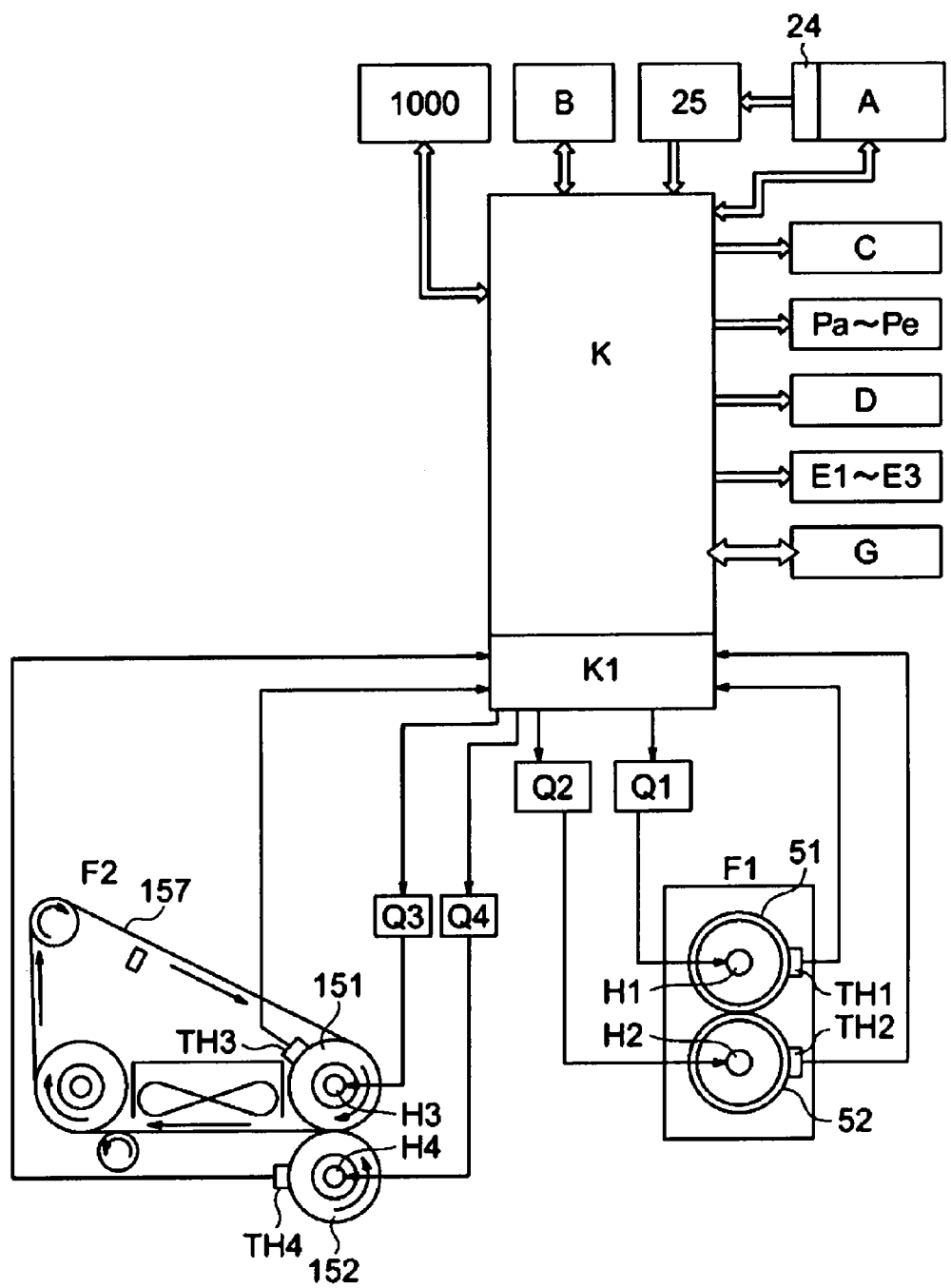
FIG. 2 is a block diagram illustrating a control system according to an embodiment of the present invention.

FIG. 1 is a diagram illustrating the schematic configuration of an image forming system according to an embodiment of the present invention. FIG. 2 is a block diagram illustrating a control system according to an embodiment of the present invention. As shown in FIG. 1, an image forming system according to this embodiment is a full-color electrophotographic image forming system of a five drum type (an in-line type and a tandem type), which is a multifunctional machine that functions as a copying machine, a printer, and a facsimile.

The image forming system includes an apparatus body 100 that includes image forming stations Pa to Pe of an electrophotographic system and a fixer F1 of a high temperature separation system functioning as fixing device, and a second fixing unit 200 that includes a fixer F2 of a cooling separation system functioning as glossing device (which will be described in detail below). The second fixing unit 200 is connected to the apparatus body 100. The second fixing unit 200 is provided to be separated from the apparatus body 100, and used in combination with the apparatus body 100. In this embodiment, a system that includes the apparatus body 100 and the second fixing unit 200 is called an image forming system. In a second embodiment, a fixer of a cooling separation system may be provided in the image forming apparatus. Even in the case where the fixer of the cooling separation system and the fixer of the high temperature separation system are provided in one apparatus, it is assumed that one apparatus is called an image forming system.

A controller (a control circuit portion and a control board portion) K functions as controller for performing whole control on the image forming apparatus. An external input device (external host device) 1000 is a device, such as a personal computer and a facsimile device. The external input device is electrically connected to the controller K through an interface. As a result, the controller K operates as area acquiring means for acquiring an area where a toner image is to be formed. A memory G is needed when a controlling apparatus executes a program. The memory G is electrically connected to the controller K. As a result, the controller K develops a program to be executed to the memory G or transmits a raster image developed to the memory G to the image forming device, thereby forming a toner image on a recording material.

The apparatus body 100 includes first to fifth image forming stations Pa, Pb, Pc, Pd, and Pe that function as toner image forming device of electrophotographic system, in a horizontal direction toward a left side from a right side in FIG. 1. The image forming stations Pa, Pb, Pc, and Pd that function as color toner image forming device form color toner images on a recording material. Further, the image forming station Pe that functions as transparent toner image forming device forms a transparent toner image on the recording material. The image forming apparatus 100 has an original reading portion (image scanner) A, an operation panel B, a laser scanning mechanism (laser scanner) C, and a transfer belt mechanism (transfer device) D. The image forming apparatus 100 has first and second sheet cassettes (cassette feeding portions) E1 and E2, a manual sheet tray (manual feeding portion) E3, and a fixer F1 of a high temperature separation system.

An original reading portion A has an original base plate glass 21 and an original pressing plate 22 that is opened and closed with respect to the original base plate glass 21. The original reading portion A is disposed on a top surface of the apparatus body 100, and optically scans an original O disposed on the original base plate glass 21 and performs color separation and photoelectric read operations on an original image. The operation panel B performs an input of a command from an operator or a report of an apparatus state to the operator. The laser scanning mechanism (laser scanner) C is disposed on the first to fifth image forming stations Pa to Pe, and has a plurality of optical scanning device. The transfer belt mechanism D is disposed below the first to fifth image forming stations Pa to Pe. The first and second sheet cassettes (cassette feeding portions) E1 and E2 are disposed at two upper and lower stages at a side lower than a transfer belt mechanism D. The manual sheet tray (manual feeding portion) E3 is folded with respect to the image forming apparatus 100 as shown by a solid line and freely stored therein. When the manual sheet tray E3 is used, the manual sheet tray E3 is opened as shown by a dotted line. The fixer F1 that functions as the fixing device is disposed on a downstream of a recording material conveying direction more than the transfer belt mechanism D.

In the case of a copy (original copy) mode, the original (a color original and a monochrome color original) O that is copied on the original base plate glass 21 is loaded downward from an image surface in accordance with a predetermined loading reference and the original pressing plate 22 is covered on the original O, thereby setting the original O. While using the original pressing plate 22 as an automatic original feeding apparatus (ADF and RDF), a sheet-shaped original may be automatically fed to the original base plate glass 21. In addition, after a desired copy condition is set by the operation panel B, a copy start key 400 (not shown) is pressed. In this case, a movement optical system 23 moves along a bottom surface of the original base plate glass 21, and a downward image surface of the original O on the original base plate glass 21 is optically scanned. The original scan light forms images in a CCD 24 that is a photoelectric conversion element (solid-state image sensing device), and the images are separated by three primary colors of RGB (red, green, and blue) and read. The individual read RGB signals are input to an image processing portion 25. In addition, electrical image information that is processed for C, M, Y, and K in the image processing portion 25 is input to the controller K that functions as the controller. The controller K controls the laser scanning mechanism C, and outputs laser beams modulated to correspond to the electrical image information to the first to fifth image forming stations Pa to Pe, respectively.

In the case of a printer mode, the personal computer that is the external host device 1000 inputs the electrical image information to the controller K of the image forming apparatus 100. The image forming apparatus 100 forms an image in accordance with the input electrical image information. As a result, the image forming apparatus 100 functions as the printer.

In the case of a facsimile reception mode, a counterpart facsimile device that is the external host device 1000 inputs the electrical image information to the controller K of the image forming apparatus 100. As a result, the image forming apparatus functions as a facsimile receiver.

Figure 3:
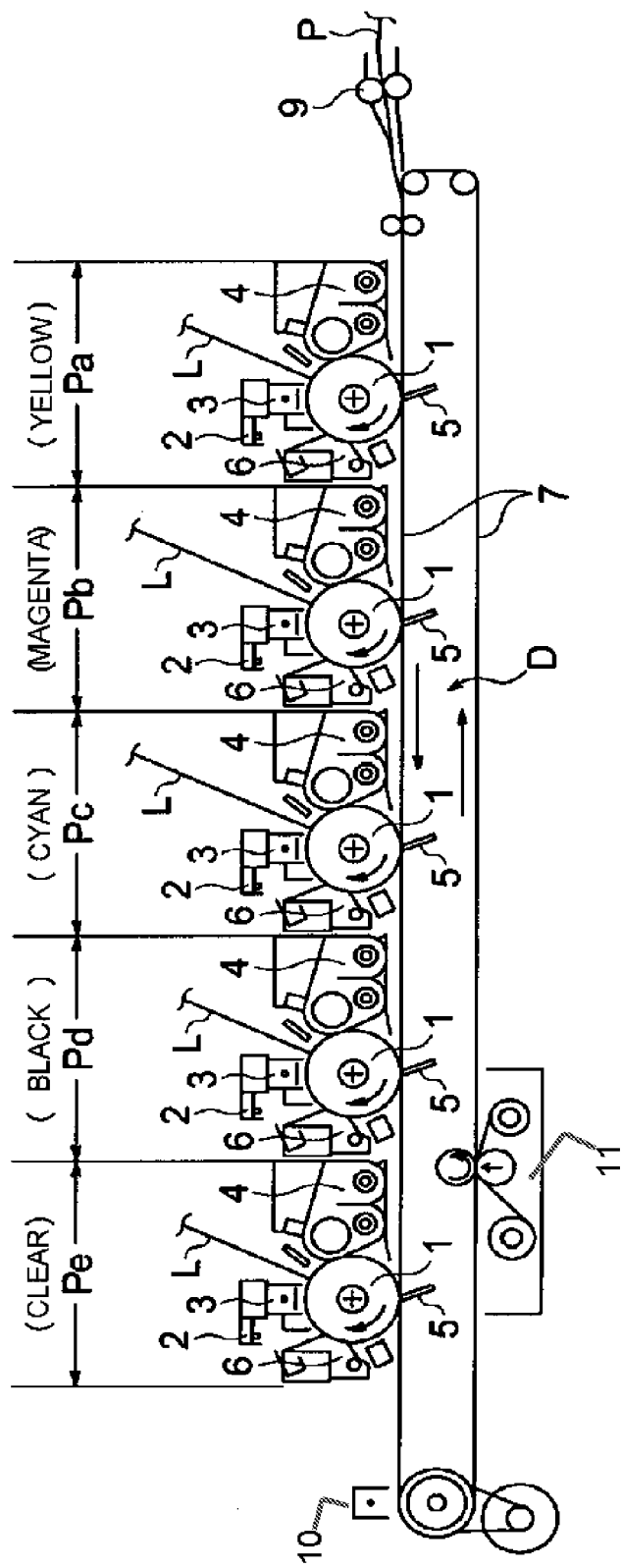
FIG. 3 is an enlarged view illustrating an image forming station according to an embodiment of the present invention.

FIG. 3 is an enlarged view illustrating portions of first to fifth image forming stations Pa to Pe and a portion of a transfer belt mechanism D. As shown in FIG. 3, each of the first to fifth image forming stations Pa to Pe has the same electrophotographic process mechanism. Each of the image forming stations has an electrophotographic photosensitive drum 1 that functions as an image bearing member, an entire surface exposure lamp (discharge lamp) 2 as process means for acting with respect to the photosensitive drum 1, a primary charger 3, a development device 4, a transfer charger 5, and a drum cleaner 6.

In the development device 4 of the first image forming station Pa, a color toner (color toner) for yellow (Y) that serves as a developer is supplied by a supply device. In the development device 4 of the second image forming station Pb, a color toner for magenta (M) that serves as a developer is supplied by the supply device. In the development device 4 of the third image forming station Pc, a color toner for cyan (C) that serves as a developer is supplied by the supply device. In the development device 4 of the fourth image forming station Pd, a color toner for black (Bk) that serves as a developer is supplied by the supply device. In the development device 4 of the fifth image forming station Pe, a clear toner for a transparent (T) color (transparent toner) that serves as a developer is supplied by the supply device.

Here, the toners that are used in this embodiment will be described. The toners used in this embodiment are toners using a polyester resin. In this embodiment, the toners are manufactured using a crushing technique. As a method of manufacturing toners, a method (polymerization method), such as a suspension polymerization method, an interface polymerization method, or a dispersion polymerization method, which directly manufactures toners in a medium, is also preferably used. However, the toner components and the method of manufacturing toners are not limited to the above examples.

As a method of manufacturing a transparent toner, in this embodiment, the transparent toner is manufactured using the same polyester resin as that of the color toner without mixing a color pigment.

The transparent toner is not necessarily transparent. For example, the transparent toner used in this embodiment is white in a non-fixed state. The reason why the transparent toner is viewed as a white color is because most of light is diffused on a surface of the toner crushed to have a grain size of about 5 to 10 μm and the amount of transmitted and absorbed light is extremely small.

That is, when the amount of energy applied to the fixed transparent toner is small, the transparent toner is not completely transparent. As a result, the transparent toner may be viewed white.

Further, all of the temperatures of the color toner and the transparent toner T for YMCBk used in this embodiment at a glass transition temperature Tg are at 50° C.

Further, the temperature of the toner at the glass transition temperature Tg is measured using a DSC method. The DSC method is simply described. In the DSC method, the temperature of a test piece is increased with a ratio of 20° C./min from a room temperature, a heat emission amount is measured by a differential scanning calorimeter, two extending lines are drawn in a created heat absorption curve (heat emission curve), and the glass transition temperature Tg is calculated from an intersection point of a ½ straight line between the extending lines and the heat absorption curve. In this method, EXTRA6000 DSC (a transition temperature measuring method of JISK7121 plastic) that is manufactured by SII NanoTechnology Inc. is used.

The transfer belt mechanism D has an endless transfer belt 7 and a driving roller 7a and turn rollers 7b and 7c that are formed by winding and extending the endless transfer belt 7. If the driving roller 7a is rotationally driven through a power transmitting device such as a timing belt device by a driving motor M, the transfer belt 7 is rotationally driven at a predetermined speed in a counterclockwise direction of an arrow. The transfer belt 7 is formed of a dielectric resin sheet, such as a polyethylene terephthalate resin sheet (PET resin sheet), a polyvinylidene-fluoride resin sheet, or a polyurethane resin sheet. In addition, both ends of the resin sheet overlap each other and are bonded to each other to have an endless shape, or a seamless belt is used.

The image forming apparatus according to this embodiment can execute a plurality of image forming modes in which glosses of images to be formed are different from each other. That is, the plurality of modes include a four color mode where an image is formed using only a color toner without using a clear toner and a clear mode where an image is formed using the color toner and the clear toner. Further, examples of the clear mode may include a high gloss mode where fixation is made using the fixer F1 of the high temperature separation system and the fixer F2 of the cooling separation system and a middle gloss mode where fixation is made using only the fixer F1 serving as fixing device without using the fixer F2 of the cooling separation system, which will be described in detail below.

(2) Four Color Mode

First, the full color image forming operation in a four color mode will be described. The image forming operation in the clear mode will be described in detail in the following (3). The selection between the non-clear mode and the clear mode can be made by the operation panel B that will be described in detail in the following (5).

In the case of the four color mode, in the first to fifth image forming stations Pa, Pb, Pc, Pd, and Pe and the first to fourth image forming stations Pa, Pb, Pc, and Pd, images are formed. In the fifth image forming station Pe, the rotation of the photosensitive drum 1 is made but a clear toner image is not formed.

That is, the first to fifth image forming stations Pa, Pb, Pc, Pd, and Pe are sequentially driven at predetermined control timing. If each image forming station is driven, the photosensitive drum 1 of each image forming station rotates in a clockwise direction of an arrow. Further, the transfer belt 7 of the transfer belt mechanism D also rotationally driven. Also, the laser scanning mechanism C is driven. In synchronization with the driving, the primary charger 3 in the first to fourth image forming stations Pa, Pb, Pc, and Pd uniformly charges a surface of the photosensitive drum 1 with predetermined polarity and potential. The laser scanning mechanism C performs laser beam scanning exposure L according to an image signal on a surface of each photosensitive drum 1 of the first to fourth image forming stations Pa, Pb, Pc, and Pd. As a result, an electrostatic image according to an image signal is formed on the surface of each photosensitive drum 1 of the first to fourth image forming stations Pa, Pb, Pc, and Pd. That is, the laser scanning mechanism C scans a laser beam emitted from a light source device by rotating a polygon mirror 8, deflects a light beam of scanned light by a reflection mirror, collects light on a bus line of the photosensitive drum 1 by an fθ lens, and performs exposure. As a result, an electrostatic image according to an image signal is formed on the photosensitive drum. The formed electrostatic image is developed as a toner image by the development device 4. As such, the image forming device that includes the laser scanning mechanism C and the image forming stations can form a toner image on a recording material in accordance with an image signal input from the controller K. For this reason, the color toner image is formed on the recording material by color image forming device that includes the image forming stations Pa to Pd serving as the color toner image forming device and the laser scanning mechanism C corresponding to the image forming stations. The electrical image information that is used to form the color toner image can be input from the external host device 1000 or the image reading portion A to the controller K. The controller K controls the transparent image forming device such that a color toner image according to the input electrical image information is formed on the recording material. Further, the controller K may form the color toner image on the recording material using the electrical image information that is stored in the memory G.

By the above-mentioned electrophotographic process operation, a yellow toner image corresponding to a yellow component image of a full color image is formed on a peripheral surface of the photosensitive drum 1 of the first image forming station Pa. A magenta toner image corresponding to a magenta component image of a full color image is formed on a peripheral surface of the photosensitive drum 1 of the second image forming station Pb. A cyan toner image corresponding to a cyan component image of a full color image is formed on a peripheral surface of the photosensitive drum 1 of the third image forming station Pc. A black toner image corresponding to a black component image of a full color image is formed on a peripheral surface of the photosensitive drum 1 of the fourth image forming station Pd. In the fifth image forming station Pe, the rotation of the photosensitive drum 1 is made but a clear toner image is not formed.

Meanwhile, a feeding roller of a feeding portion that is selected and designated in the first sheet cassette E1, the second sheet cassette E2, and the manual sheet tray E3 is driven. As a result, the recording material P that is loaded and stored in the feeding portion is separated by one sheet and fed. In addition, the recording material P is supplied to the transfer belt 7 of the transfer belt mechanism D via a plurality of conveying rollers and a registration roller 9. The recording material P that is supplied to the transfer belt 7 is conveyed by the transfer belt 7 and sequentially transmitted to the transfer portions of the first to fifth image forming stations Pa, Pb, Pc, Pd, and Pe. The transfer portion of each image forming station comes into contact with the photosensitive drum 1 and the transfer belt 7.

If the transfer belt 7 is rotationally driven and it is confirmed that the transfer belt 7 is disposed at a predetermined location, the recording material P is transmitted from the registration roller 9 to the transfer belt 7, and conveyed to the transfer portion of the first image forming station Pa. At the same time, an image write signal is turned on, and an image is formed with respect to the photosensitive drum 1 of the first image forming station Pa at predetermined control timing based on a point of time when the image write signal is turned on. In addition, at the transfer portion of the photosensitive drum 1 at the side of the bottom surface, the transfer charger 5 applies an electric field or an electric charge. As a result, a toner image for yellow as a first color that is formed on the photosensitive drum 1 is transferred to the recording material P. As a result, the recording material P is securely held on the transfer belt 7 by means of an electrostatic adsorption force and then sequentially conveyed to the transfer portions of the second to fourth image forming stations Pb, Pc, and Pd. In addition, the recording material P is subjected to sequential overlapping and transferring of the toner images of the individual colors including magenta, cyan, and black, which are formed on the individual photosensitive drums of the second to fourth image forming stations Pb, Pc, and Pd. As a result, four color full color toner images that are not fixed to the recording material p are synthesized. In the fifth image forming station Pe, the photosensitive drum 1 rotates but a clear toner image is not formed. Accordingly, the transfer of the clear toner image in the transfer portion of the fifth image forming station Pe to the recording material P is not made.

A contact charging device is used as the transfer charger 5. Further, it is known that transfer charging device makes a current used when the toner image is transferred constant, thereby stabilizing an image. Accordingly, even when a volume resistance value is varied depending on the kind of the recording material (thickness or material) or a hygroscopic condition, various constant current controls where a constant current is obtained are generally performed.

The recording material P where the four-color full-color toner images are synthesized is discharged by the separating charger 10 at a downstream portion of a conveying direction of the transfer belt 7 and an electrostatic adsorption force is attenuated. As a result, the recording material P is separated from a terminal of the transfer belt 7. In particular, in a low humidity environment, the recording material P is dried and electrical resistance is increased. Therefore, the electrostatic adsorption force between the recording material P and the transfer belt 7 is increased and an effect of the separating charger 10 is increased. Generally, since the separating charger 10 charges the recording material P in a state where a toner image is not fixed, a non-contact charging device is used. A cleaning device 11 cleans a surface of the transfer belt 7.

Figure 5:
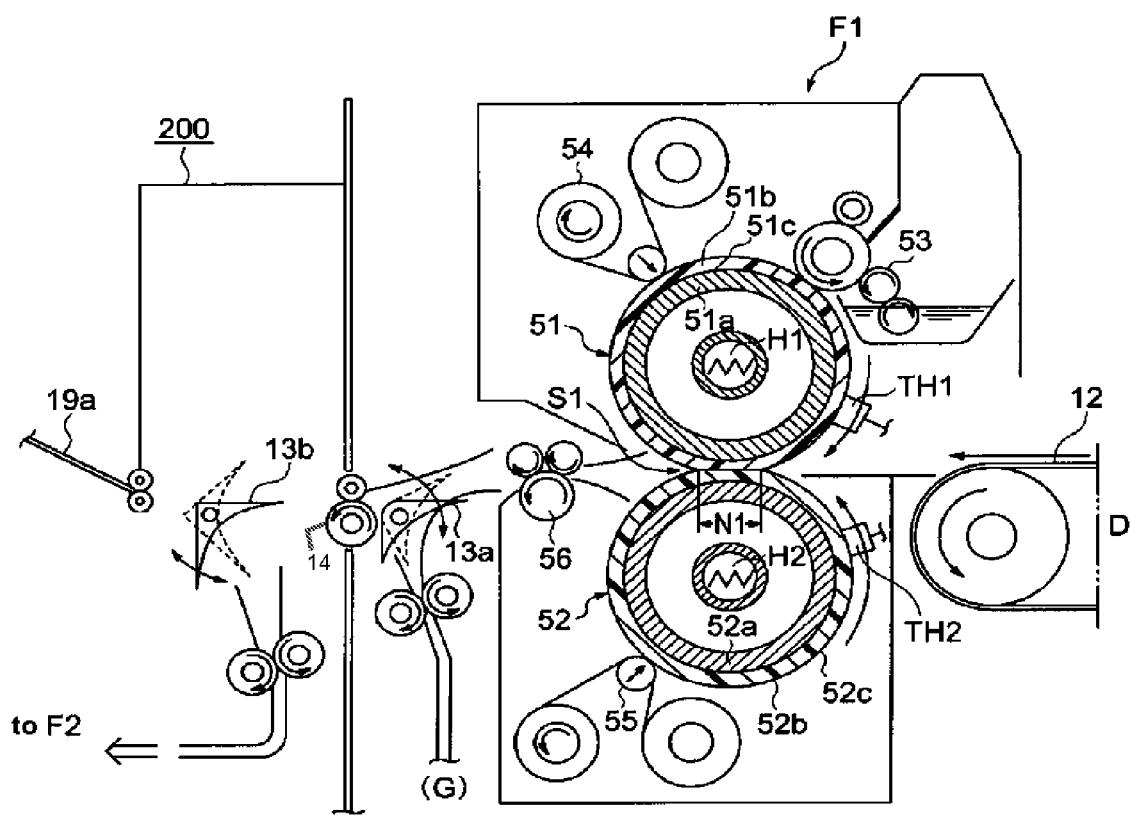
FIG. 5 is an enlarged view illustrating a fixer of a high temperature separation system according to an embodiment of the present invention.

The recording material P that is separated from the transfer belt 7 is introduced into the fixer F1 of the high temperature separation system by fixing the non-fixed toner image on the surface of the recording material by the conveyer belt 12. In this embodiment, the fixer F1 of the high temperature separation system that functions as the fixing device is a thermal roller fixing device shown in FIG. 5. The fixer F1 that functions as the fixing device will be described in detail in the following (6). The recording material P that is introduced into the fixer F1 enters into a fixing nip portion N1 (first nip portion) that is a pressure welding portion of a fixing roller 51 and a pressure roller 52 and is nipped and conveyed. As a result, the recording material P is heated and pressurized, and colors of the individual toner images are mixed and the individual toner images are fixed to the recording material P. The recording material P that passes the fixing nip portion N1 is discharged and conveyed by a fixing/discharge roller 56, passes an upper side of a first selector 13a that is switched into a first posture shown by a solid line of FIG. 5, is linked to a body discharge roller 14, and is discharged from the apparatus body 100. Next, the recording material P passes an upper side of a second selector 13b that is provided in the second fixing unit 200, and is discharged to a discharge portion 19a that is provided on the second fixing unit 200.

(3) Clear Mode

Next, the full color image forming operation in a clear mode will be described. In the clear mode, in addition to formation of the color toner images by the first to fourth image forming stations Pa, Pb, Pc, and Pd, a clear toner image is formed by the fifth image forming station Pe, and an image having a high gloss is formed. The clear mode is divided into a "middle gloss mode" and a "high gloss mode" where an image having a gloss higher than that in the middle gloss mode is obtained. First, the contents that are common to the "middle gloss mode" and the "high gloss mode" will be described. The "middle gloss mode" and the "high gloss mode" can be selected by the operation panel B that will be described with reference to FIG. 4.

In this case, the transparent toner image is formed on the recording material by the transparent image forming device that includes the image forming station Pe serving as the transparent toner image forming device and the laser scanning mechanism C corresponding to the image forming station. The electrical image information that is used to form the transparent toner image can be input from the external host device 1000 or the image reading portion A to the controller K. The controller K controls transparent image forming device, such that a transparent toner image according to the input electrical image information is formed on the recording material. Further, the controller K may form the transparent toner image on the recording material using the electrical image information that is stored in the memory G.

If the electrical image information is input, the first to fifth image forming stations Pa to Pe are sequentially driven at predetermined control timing. If each image forming station is driven, the photosensitive drum 1 of each image forming station rotates in a clockwise direction of an arrow. Further, the transfer belt 7 of the transfer belt mechanism D also is rotationally driven. Also, the laser scanning mechanism C is driven. In synchronization with the driving, the primary charger 3 in the first to fifth image forming stations Pa to Pe uniformly charges a surface of the photosensitive drum 1 with predetermined polarity and potential. The laser scanning mechanism C performs laser beam scanning exposure L according to an image signal on a surface of each photosensitive drum 1 of the first to fourth image forming stations Pa to Pd. As a result, an electrostatic image according to an image signal is formed on the surface of each photosensitive drum 1 of the first to fourth image forming stations Pa to Pd. That is, the laser scanning mechanism C scans a laser beam emitted from a light source device by rotating the polygon mirror 8, deflects a light beam of scanned light by a reflection mirror, collects light on a bus line of the photosensitive drum 1 by an fθ lens, and performs exposure. As a result, an electrostatic image according to an image signal is formed on the photosensitive drum. The formed electrostatic image is developed as a toner image by the development device 4.

By the above-mentioned electrophotographic process operation, yellow, magenta, cyan, and black toner images corresponding to yellow, magenta, cyan, and black component images of a full color image are formed on peripheral surfaces of the photosensitive drums 1 of the first to fourth image forming stations Pa to Pd. Finally, a transparent toner image is formed in the fifth image forming station Pe.

Meanwhile, the recording material P is conveyed to the registration roller 9 from the feeding portion that is selected and designated in the first sheet cassette E1, the second sheet cassette E2, and the manual sheet tray E3.

If the transfer belt 7 is rotationally driven and it is confirmed that the transfer belt 7 is disposed at a predetermined location, the recording material P is transmitted from the registration roller 9 to the transfer belt 7, and conveyed to the transfer portion of the first image forming station Pa. At the same time, an image write signal is turned on, and an image is formed with respect to the photosensitive drum 1 of the first image forming station Pa at predetermined control timing based on a point of time when the image write signal is turned on. In addition, at the transfer portion of the photosensitive drum 1 at the side of the bottom surface, the transfer charger 5 applies an electric field or an electric charge. As a result, a toner image for yellow as a first color that is formed on the photosensitive drum 1 is transferred to the recording material P. As a result of this transfer the recording material P is securely held on the transfer belt 7 by means of an electrostatic adsorption force and then sequentially conveyed to the transfer portions of the second to fifth image forming stations Pb to Pe. In addition, the recording material P is subjected to sequential overlapping and transferring of the toner images of the individual colors including magenta, cyan, black, and transparent colors, which are formed on the photosensitive drums of the second to fifth image forming stations Pb to Pe. As a result, four-color full-color toner images that are not fixed to the recording material P and the transparent toner image are synthesized.

(Fixing Process)

Next, a process of fixing a toner image to a recording material P will be described. In the middle gloss mode (second image forming mode) and the high gloss mode (first image forming mode), fixing processes are different from each other.

First, a fixing process in the middle gloss mode will be described. The recording material P that is separated from the transfer belt 7 is introduced into the fixer F1 that fixes the non-fixed toner image on the surface of the recording material by the conveyer belt 12. The recording material P that is introduced into the fixer F1 functioning as the fixing device enters into the fixing nip portion N1 that is a pressure welding portion of the fixing roller 51 and the pressure roller 52 and is nipped and conveyed. As a result, the recording material P is heated and pressurized, and thus, colors of the individual toner images are mixed and the individual toner images are fixed to the recording material P. The recording material P where the toner image is fixed is discharged from the apparatus body 100 by a fixing/discharge roller 56 and conveyed, passes an upper side of the first selector 13a that is switched into a first posture shown by a solid line of FIG. 5, is linked to the body discharge roller 14, and is discharged from the apparatus body 100. Next, the recording material P passes an upper side of the second selector 13b that is provided in the second fixing unit 200, and is discharged to the first discharge portion 19a that is provided on the second fixing unit 200.

Next, a fixing process in the high gloss mode will be described. The recording material P of which a toner image is heated by the fixer F1 and which is discharged from the apparatus body 100 and conveyed passes a side of the second selector 13b that is switched into a second posture shown by a broken line of FIG. 5 and is conveyed to the fixer F2 of the cooling separation system that functions as the glossing device. The recording material P that is introduced into the fixer F2 functioning as the glossing device enters into a fixing nip portion N2 (second nip portion) that is a pressure welding portion of a fixing belt 157 and a pressure roller 152 shown in FIG. 6 and is heated and fixed while being nipped and conveyed. As a result, the recording material P that passes the fixing nip portion N2 is cooled down in a cooling fan 156 and then separated from the fixing belt 157. The recording material P where the toner image is fixed by the fixer F2 serving as the glossing device is discharged to the second discharge portion 19b.

(4) Monochrome Color Mode

The image forming apparatus according to this embodiment can output a monochrome image forming object or a monochrome color (simple color) image forming object. If the monochrome color mode (key 430 in FIG. 4) is selected by the operation panel B, among the first to fifth image forming stations Pa to Pe, the image forming station corresponding to the selected image forming mode performs the image forming operation. In the other image forming stations, the rotation drive of the photosensitive drum 1 is made but the image forming operation is not performed. In addition, in the transferring portion of the image forming station where the image forming operation is performed, a sequence of transferring a toner image to the recording material P that is conveyed by the transfer belt mechanism D is executed.

(5) Operation Panel B

Figure 4:
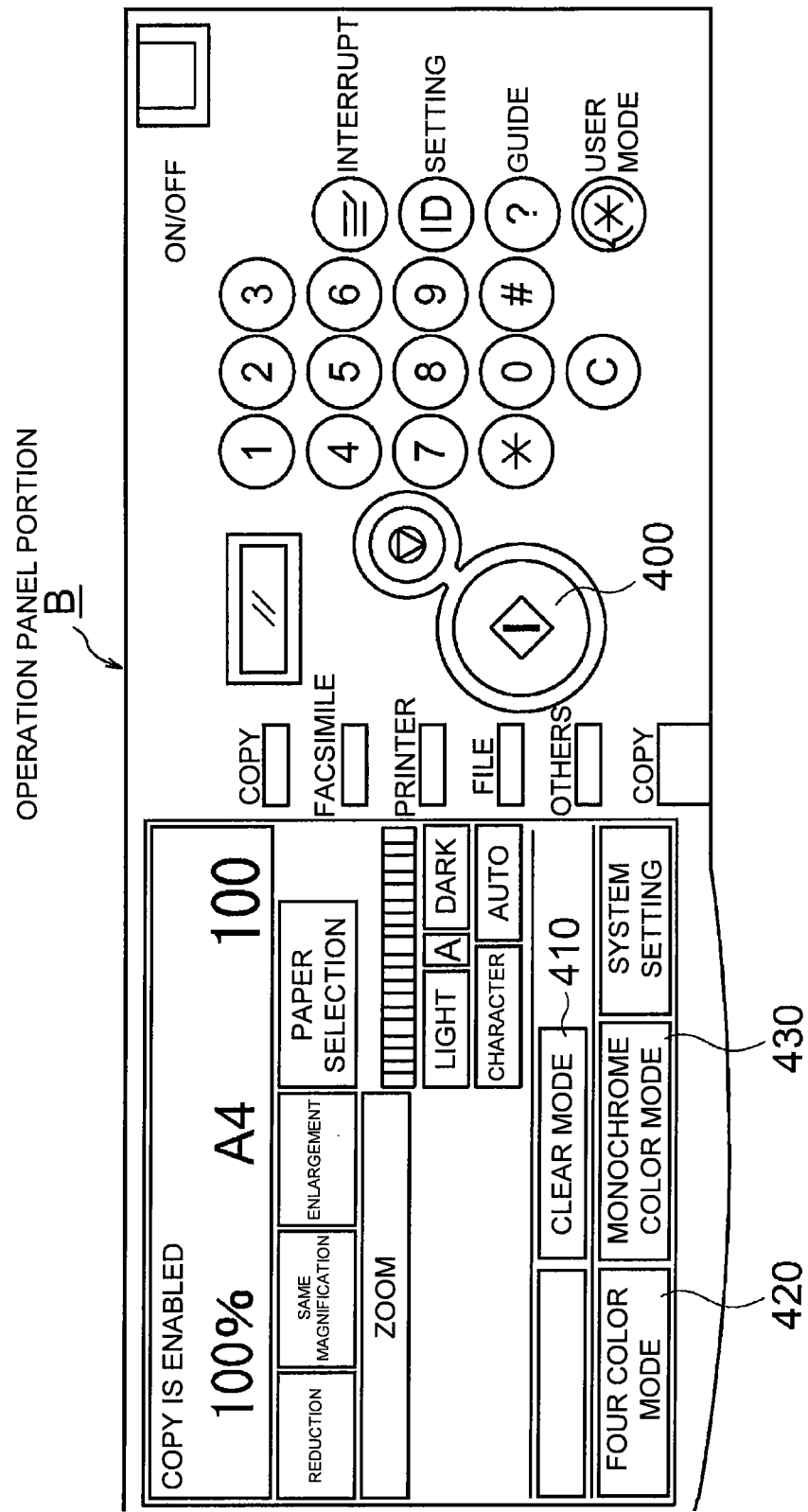
FIG. 4 is a plan view illustrating an operation panel portion according to an embodiment of the present invention.
Figure 9:
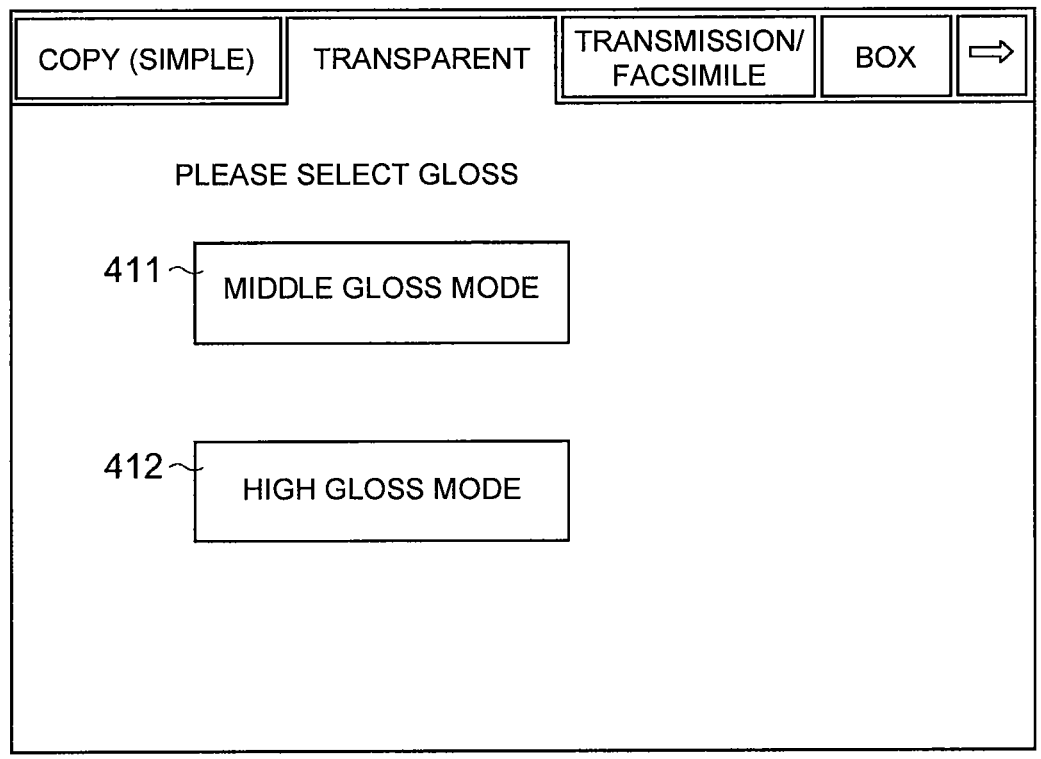
FIG. 9 is a diagram illustrating an example of a screen that is displayed on a display in accordance with an embodiment of the present invention.

FIG. 4 is a plan view illustrating an operation panel B. A copy start key 400 instructs to start a copy. A key 410 selects a clear mode. If the key 410 is pressed, the display of the operation panel B is switched as shown in FIG. 9. In FIG. 9, a key 411 selects a "middle gloss mode", and a key 412 selects a "high gloss mode". If the key 411 or the key 412 is pressed, the display is returned to the display shown in FIG. 4. In FIG. 4, a key 420 selects a four color mode and a key 430 selects a monochrome color mode.

When the "middle gloss mode" is selected, the controller K controls the image forming apparatus such that the toner image on the recording material is fixed using the fixer F1 of the high temperature separation system. Further, when the "high gloss mode" is selected, the controller K controls the image forming apparatus such that the toner image on the recording material is fixed using the fixer F2 of the cooling separation system. As described above, the controller K can form a toner image on the recording material in accordance with the electrical image information that is input from the external host device 1000 or the image reading portion A. However, in the following description, for simplification of description, it is assumed that an image is formed using the electrical image information that is stored in the memory G and used to uniformly form a transparent toner image on an image forming area on the recording material.

(6) Fixer F1 of a High Temperature Separation System

FIG. 5 is a schematic cross-sectional view of a fixer F1 of a high temperature separation system. The fixer F1 of the high temperature separation system that functions as the fixing device is a thermal roller fixing device. As shown in FIG. 5, the fixer F1 arranges a fixing roller (fixing member) 51 functioning as a rotator supported by a bearing to freely rotate and a pressure roller (pressurizing member) 52 in parallel in a vertical direction and welds the fixing roller and the pressure roller with pressure, thereby forming the fixing nip portion N1.

The fixing roller 51 adopts a concentrically three-layered structure, and has a core portion 51a, an elastic layer 51b, and a toner parting layer 51c. The core portion 51a is formed of a hollow pipe that is made of aluminum and has a diameter of 44 mm and a thickness of 5 mm. The elastic layer 51b is formed of silicon rubber that has JIS-A hardness of 50 degrees and a thickness of 2.5 mm. The toner parting layer 51c is formed of a PFA that has a thickness of 50 μm. In the hollow pipe of the core portion 51a, a halogen lamp H1 that functions as a heat source (roller heater) is disposed.

Similar to the fixing roller 51, the pressure roller 52 also has a three-layered structure that includes a core portion 52a, an elastic layer 52b, and a toner parting layer 52c. However, the elastic layer 52b uses silicon rubber that has a thickness of 3 mm. This is because it is possible to gain a width of the fixing nip portion N by the elastic layer 52b. In the hollow pipe of the core portion 52a of the pressure roller 52, a halogen lamp H2 that functions as a heat source (roller heater) is disposed.

The pressurizing force of the pressure roller 52 is 294 N (30 kgf) at total pressure. At this time, the width of the fixing nip portion N is 7 mm. The fixing roller 51 and the pressure roller 52 are rotationally driven at a surface speed of 100 mm/s while being welded with pressure in an arrow direction by means of a driving motor (not shown).

Heater H1 and H2 are supplied with power from power supply circuits Q1 and Q2 (refer to FIG. 2), respectively, and emit heat. The fixing roller 51 and the pressure roller 52 are heated from the inner sides thereof by heat emitted from the heaters H1 and H2. The heater H1 uses a heater of 800 W and the heater H2 uses a heater of 500 W. In addition, the surface temperatures of the fixing roller 51 and the pressure roller 52 are monitored by temperature sensors TH1 and TH2, such as thermistors, which come into contact with the fixing roller and the pressure roller, and electrical information that is related to the detected temperatures is input to a fixing control portion K1 of the controller K. Based on the input electrical information, the fixing control portion K1 controls the amount of power supplied from the power supply circuits Q1 and Q2 to the heaters H1 and H2, such that the surface temperatures (fixing temperatures) of the fixing roller 51 and the pressure roller 52 are maintained at the predetermined control temperature (target temperature). That is, the temperatures of the fixing roller 51 and the pressure roller 52 are adjusted and managed to become the predetermined control temperature, thereby adjusting and managing the temperature in the fixing nip portion N1.

In this embodiment, the target temperatures of the fixing roller 51 and the pressure roller 52 are set to 160° C.

A parting agent applying device 53 applies diethyl silicon oil serving as a parting agent to a surface of the fixing roller 51. The cleaning device 54 is a web-typed cleaning device that washes and cleans the surface of the fixing roller 51. The cleaning device 55 is a web-typed cleaning device that washes and cleans the surface of the pressure roller 52. The web is a heat resistant cleaning member.

The fixing roller 51 and the pressure roller 52 are rotationally driven, the inner portions of the fixing roller 51 and the pressure roller 52 are heated by the heaters H1 and H2, and the surface temperatures thereof are increased to the predetermined control temperature and adjusted. In this state, the recording material P where the non-fixed toner image is formed is introduced into the fixer F1 from the side of the transfer belt mechanism D by the conveyer belt 12. In addition, while the recording material P enters into the first fixing nip portion (first nip portion) N1 and is nipped and conveyed, the recording material is heated by the fixing roller 51 and the pressure roller 52 and pressurized by the nip pressure. As a result, yellow, magenta, cyan, black, and transparent multiple toner images are melt and mixed and fixed to the surface of the recording material P as a full color image.

The recording material P that is discharged from the fixing nip portion N1 is separated from the fixing roller 51 by the first separation portion S1 at a downstream side of the first fixing nip portion N1 by a separation projection 57, in a state where the temperature of the recording material is the high temperature. In addition, the recording material P is linked to the fixing/discharge roller 56 and transmitted from the fixer F1 serving as the fixing device.

Further, the surface temperature of the fixing roller 51 in the first separation portion S1 is set to a temperature that is at least 20° C. higher than a glass transition temperature Tg of the toner. That is, in this embodiment, since the glass transition temperature Tg is at 50° C., the surface temperature of the fixing roller 51 is adjusted such that the temperature of the first separation portion S1 becomes 70° C. or more.

If the temperature of the first separation portion S1 is set as described above, the recording material P is separated from the fixing roller 51 in a state where the toner image is softened. At this time, unevenness of the surface of the recording material P is buried by the softened toner by loading the toner of 0.5 mg/cm$^2$ for each unit area of the recording material P, and the surface of the toner image is smoothened.

When the parting agent applying device 53 applies the silicon oil to the surface of the fixing roller 51 and the recording material P passes through the fixing nip portion N, the toner is made not to be attached to the surface of the fixing roller 51. The cleaning devices 54 and 55 remove the toners to be offset on the surfaces of the fixing roller 51 and the pressure roller 52, respectively.

(7) Fixer F2 of a Cooling Separation System

Figure 6:
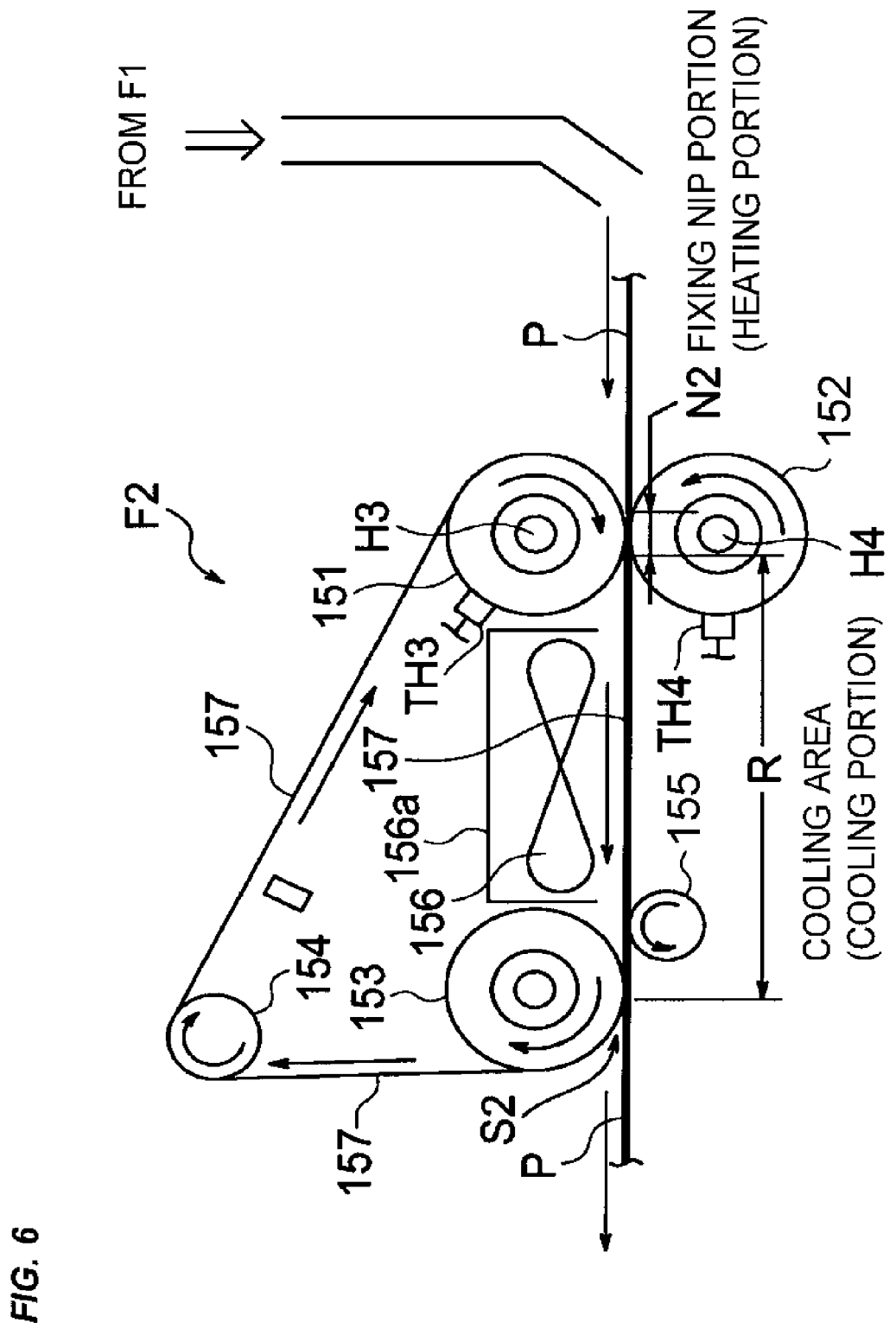
FIG. 6 is an enlarged view illustrating a fixer of a cooling separation system according to an embodiment of the present invention.

FIG. 6 is an enlarged view of a fixer F2 that functions as glossing device. As shown in FIG. 6, the fixer F2 that functions as the glossing device is a fixer that includes a belt serving as a conveying device of the cooling separation system. The fixer F2 that functions as the glossing device has a fixing roller 151 that functions as heating device, a pressure roller 152, a rotation roller (separation roller) 153, a rotation roller (tension roller) 154, an auxiliary roller 155, and a cooling fan 156 that functions as cooling device. The fixing roller 151, the pressure roller 152, the separation roller 153, the tension roller 154, and the auxiliary roller 155 are disposed substantially in parallel. The endless fixing belt 157 that functions as the conveying device is wound and extended between the three rollers 151, 153, and 154.

The pressure roller 152 nips the fixing belt 157 serving as the conveying device such that fixing belt 157 and the fixing roller 151 stand face to face with each other, and welds the fixing belt 157 and the fixing roller 151 with pressure. The separation roller 153 is disposed to be 250 mm apart from the fixing roller 151. The tension roller 154 is disposed on the separation roller 153. The auxiliary roller 155 is disposed to come into contact with an external surface of the fixing belt at a location biased to the separation roller 153, in the fixing belt portion between the fixing roller 151 and the separation roller 153. The cooling fan 156 is disposed between the fixing roller 151 and the separation roller 153 at the inner side of the fixing belt 157, and partially air-cools the fixing belt between the fixing roller 151 and the separation roller 153.

The fixing roller 151 adopts a concentrically three-layered structure, and has a core portion, an elastic layer, and a toner parting layer. The core portion is formed of a hollow pipe that is made of aluminum and has a diameter of 44 mm and a thickness of 5 mm. The elastic layer is formed of silicon rubber that has JIS-A hardness of 50 degrees and a thickness of 300 μm. The toner parting layer is formed of a PFA that has a thickness of 50 μm. In the hollow pipe of the core portion, a halogen lamp 158 that functions as a heat source (roller heater) is disposed.

The pressure roller 152 also adopts the same configuration as the fixing roller 151. The elastic layer uses silicon rubber that has a thickness of 3 mm. If the elastic layer is provided, it is possible to expand a fixing nip. In the hollow pipe of the core portion of the pressure roller 152, a halogen lamp 159 that functions as a heat source (roller heater) is disposed. As a result, the fixing belt 157 that functions as the conveying device is heated and can heat the image that comes into contact with the fixing belt. Further, when the fixing belt is heated using an IH method, an eddy current may be generated in the fixing belt to make the fixing belt emit heat. At this time, an IH coil that emits heat from the fixing belt is called heating device.

The fixing roller 151 and the pressure roller 152 nip the fixing belt 157 such that they are pressure-welded with the predetermined pressing force, thereby forming the fixing nip portion N2 that functions as a heating and pressurizing portion having a predetermined width in a recording material conveying direction. The pressurizing force of the pressure roller 152 is 490 N (50 kgf) at total pressure. At this time, the width of the fixing nip portion N2 is 5 mm.

The surface hardness of the fixing roller 151 is preferably selected in accordance with the fixing belt 157. If the surface hardness of the fixing roller 151 is small, the fixing belt 157 may be bent. As a result, the toner may not be sufficiently pushed into a receiving layer of the recording material and a toner step may remain. When the hardness of the fixing belt 157 is soft, the elastic layer becomes thin or is removed to form only a surface layer of the PFA in order to sufficiently harden the hardness of the fixing roller 151. Further, only the aluminum core may be used. In this embodiment, the fixing roller uses only aluminum.

The fixing roller is rotationally driven at a surface speed of 50 mm/s in a clockwise direction of an arrow by a driving mechanism (not shown). The fixing belt 157 rotates in a clockwise direction of an arrow by the rotation driving of the fixing roller 151. The rollers 152 to 155 rotate when the fixing belt 157 starts. The tension roller 154 applies the predetermined tension to the fixing belt 157.

The halogen lamps H3 and H4 are disposed in the fixing roller 151 and the pressure roller 152, respectively. The halogen lamps H3 and H4 are supplied with power from power supply circuits Q3 and Q4, respectively, and emit heat. The fixing roller 151 and the pressure roller 152 are heated at the inner side by heat emitted from the halogen lamps 158 and 159 and the surface temperatures thereof rise. The surface temperatures of the fixing roller 151 and the pressure roller 152 are detected by thermistors TH3 and TH4, and electrical information that is related to the temperatures detected by the thermistors is fed back to the fixing control portion K1 of the controller K. The fixing control portion K1 controls the amount of power supplied to the halogen lamps 158 and 159, such that the temperatures detected by the thermistors TH3 and TH4 are maintained at the predetermined temperatures set to the fixing roller 151 and the pressure roller 152, respectively. That is, the temperatures of the fixing roller 151 and the pressure roller 152 are adjusted and managed to become the predetermined temperature, thereby adjusting and managing the temperature of the fixing nip portion N2 to the predetermined target temperature (fixing temperature).

In this embodiment, the target temperatures of the fixing roller 151 and the pressure roller 152 are set to 160° C.

The recording medium P that is transmitted from the side of the transfer belt mechanism D to the side of the fixer F2 of the cooling separation system and has a non-fixed toner image on the surface is introduced between the pressure roller 152 and the fixing belt 157 of the fixing nip portion N2 and nipped and conveyed by the second fixing nip portion (second nip portion) N2. Even in the case where the non-fixed toner does not exist, since the fixed toner is heated again by the heating device, it is possible to increase a gloss of the fixed image. The surface of the non-fixed toner image of the recording material P faces the surface of the fixing belt 157. While the recording material P is nipped and conveyed by the fixing nip portion N2, the recording material P is heated and pressurized, and the individual toner images are mixed and fixed to the recording material P. At the same time, the recording material P closely adheres to the surface of the fixing belt 157. Then, in a state where the recording material P closely adheres to the fixing belt 157, when the fixing belt 157 rotates, the recording material P is conveyed in the cooling area (cooling portion) R between the fixing nip portion N2 and the separation roller 153. In the cooling area R, the recording material P is compulsorily and efficiently cooled down by a flow action of air that flows through the cooling fan 156 serving as cooling device and an air duct 156a that surrounds the cooling fan 156. An air flow that is orthogonal to a surface of the recording device is generated by the cooling fan 156 that serves as the cooling device.

As such, the recording material P that closely adheres to the surface of the fixing belt 157 is sufficiently cooled down in the cooling area R and reaches the location of the separation roller 153. In addition, by the second separation portion S2 where a curvature of the fixing belt 157 is varied by the separation roller 153, the recording material P is removed (curvature separation) by its rigidity from the surface of the fixing belt 157.

The surface temperature of the fixing belt 157 in the second separation portion S2 is adjusted to a temperature that is lower than a temperature 20° C. higher than the glass transition temperature temperature Tg of the toner. That is, in this embodiment, since the glass transition temperature temperature Tg is at 50° C., an air volume of the cooling fan 156 that serves as the cooling device is adjusted such that the temperature of the second separation portion S2 becomes less than 70° C.

The auxiliary roller 155 prevents the following phenomenon. In the middle of the fixing belt cooling area R from the fixing roller 151 to the separation roller 153, the recording material P is removed from the surface of the fixing belt 157, and an image is disturbed or the recording material cannot be conveyed.

Further, the cooling device is not limited to the cooling fan. For example, a cooling device of a contact-type cooling system like a heat sink may be used. Further, a Peltier element, a heat pipe, and a water-circulation-type cooling device may be used. As a result, in the "high gloss mode" that serves as the first image forming mode, the cooling fan (cooling device) 156 cools down the recording material, such that the surface temperature of the fixing belt (conveying device) 157 in a portion (second separation portion S2) of the fixer (glossing device) F2 that separates the recording material becomes lower than the temperature 20° C. higher than the glass transition temperature of the transparent toner. Further, in the "middle gloss mode" that serves as the second image forming mode, the cooling fan (cooling device) 156 cools down the recording material, such that the surface temperature becomes lower than the surface temperature in the portion of the fixer (fixing device) F1 that separates the recording material.

At this time, since the toner image is solidified along a surface shape of the specular fixing belt 157 and the entire surface of the recording material becomes a smooth surface, it is possible to obtain an image that has a gloss higher than that of the image fixed by using only the fixer F1 of the high temperature separation system.

The fixing belt 157 that functions as the conveying device is heated while closely adhering to the image surface of the sheet P. The fixing belt can transfer the surface having the high gloss along the surface of the toner image. For this reason, the gloss (60° C.) of the surface of the fixing belt 157 serving as the conveying device that comes into contact with the toner image is preferably in a range of 35 to 100%. In this embodiment, the gloss of the surface of the fixing belt 157 that comes into contact with the toner image is 100%. That is, the gloss of the surface of the fixing belt 157 can be arbitrarily selected in order to increase a gloss of the surface of the printed material obtained using the fixer of the high temperature separation system.

(8) Amount of a Color Toner Loaded to a Recording Material

In this case, the loading amount that is the weight of the color toner per unit area on the recording material P will be described. The loading amount is the weight of the toner that is formed in an area of 1 $cm^2$. The loading amount can be adjusted by changing the image data amount that is the data amount per pixel of the image information that is separated for the individual colors including C, M, Y, and K of the image that becomes the original. If the maximum image data amount of each color is represented as 100%, a concentration of each color is maximized at 100%. The image data amount can be changed in a range of 0 to 100%.

In this embodiment, when the toner loading amount is set to 0.5 mg/$cm^2$ using A2 gloss coat paper having the grammage (basis weight) of 150 g/$m^2$, a concentration of 1.8 is obtained in all colors of yellow, magenta, cyan, and black. The toner loading amount of 0.5 mg/$cm^2$ is set as the maximum loading amount (maximum toner amount) of one color, that is, the loading amount when the data amount is 100%. Further, the concentration is a value that is measured by a spectrodensitometer manufactured by X-Rite, Incorporated. The loading amount of the color toner in the data amount of 100% is set to have the same value in all of the "non-gloss mode" (a four color mode and a monochrome color mode), the "high gloss mode", and the "middle gloss mode".

Based on the data, with respect to the image data amount of each color of the input image, image correction, such as so-called gamma correction, is performed, such that color tones are the same. The toner amount is calculated for each pixel and an image is formed. In addition, various colors are represented by overlapping the toners of the individual colors. At this time, theoretically, the color image information has the image data amount of 400% to the maximum.

However, in the actual image formation, the color toner of 400% is not used, and the setting is preferably made using a method such as an UCR to be described below, such that the maximum loading amount of the color toner is in a range of 180 to 240%. In this example, as will be described below, the maximum value of the loading amount of all the color toners is set to 210%.

The UCR means Under Color Removal. When the color original is separated into four colors, a gray component is generated in a portion where three colors including C (Cyan), M (Magenta), and Y (Yellow) overlap each other. When the component is replaced by a black plate (Bk block), the gray component having the predetermined concentration or more is replaced by the black block and the total toner amount is reduced.

(9) Amount of a Transparent Toner Loaded to a Recording Material

With respect to the transparent toner, the loading amount that corresponds to the data amount of 100% is determined.

Further, the loading amount of the transparent toner image is set in accordance with the obtained gloss, not the concentration.

The transparent toner image is formed on the A2 gloss coat paper that has the grammage of 150 g/m$^2$, and the gloss with respect to the loading amount is measured. An image is formed using both the fixer F1 of the high temperature separation system serving as the fixing device in the "high gloss mode" and the fixer F2 of the cooling separation system serving as the glossing device. In the "high gloss mode", the gloss increases proportional to the loading amount. However, if the toner loading amount becomes 0.3 mg/cm$^2$ or more, the increase in the gloss is not viewed. In the "middle gloss mode", an image is formed using the fixer F1 of the high temperature separation system serving as the fixing device without using the fixer F2 of the cooling separation system serving as the glossing device. In the "middle gloss mode", the gloss increases proportional to the loading amount. However, if the toner loading amount becomes 0.5 mg/cm$^2$ or more, the increase in the gloss is not viewed.

Accordingly, in this embodiment, with respect to the transparent toner, the loading amount when the data amount is 100% is set as 0.5 mg/cm$^2$. That is, even in any case of the "high gloss mode" and the "middle gloss mode", when a pixel value of the image data is 100%, the loading amount of the transparent toner of the portion that corresponds to the pixel is set as 0.5 mg/cm$^2$. Of course, the maximum loading amount (when the data amount is 100%) of the transparent toner does not need to be the same as the maximum loading amount of the color toner, and the loading amount where the desired gloss is obtained may be used as the maximum loading amount.

Further, the gloss is measured using a Handy Glossmeter (PG-1M) manufactured by Nippon Denshoku Industries Co., LTD based on a JISZ8741 specular gloss measuring method.

(10) Adjustment of the Loading Amount in a Middle Gloss Mode and a High Gloss Mode Next, the adjustment of the transparent toner amount in the middle gloss mode and the high gloss mode, which is a characteristic of the present invention, will be described.

In this embodiment, when the "middle gloss mode" that functions as the second image forming mode where a gloss of an image is increased using the fixer of the high temperature separation system is selected, the controller K controls the image forming device, such that the transparent toner of the predetermined amount per unit area is loaded to the recording material. In the same way, the "high gloss mode" that functions as the first image forming mode where a gloss of an image is increased using the fixer of the cooling separation system is selected. At this time, if the transparent toner of the same amount as that in the case where the gloss of the image per unit area is increased using the fixer of the high temperature separation system is loaded, the crack may be easily generated in the surface of the image. For this reason, the controller K that serves as the controller performs a control operation such that the amount of the transparent toner formed for each unit area is reduced. For simplification of description, an example of when an image is formed using electrical image information that is recorded on the memory G and used to uniformly form the transparent toner image in an image forming area on the recording material will be described.

Hereinafter, the "loading amount", the "gloss", and the "generation of the crack" in the "high gloss mode" and the "middle gloss mode" will be described. Further, the recording material P uses OK top coat+(trademark) as A2 gloss coat paper that is manufactured by Oji Paper Co., Ltd., and has grammage of 150 g/m$^2$. Further, the recording material P uses color laser copier paper (trademark) as plain paper that is manufactured by Canon Marketing Japan Inc. and has grammage of 81.4 g/m$^2$. The gloss is measured using the above-described method.

Figure 7:
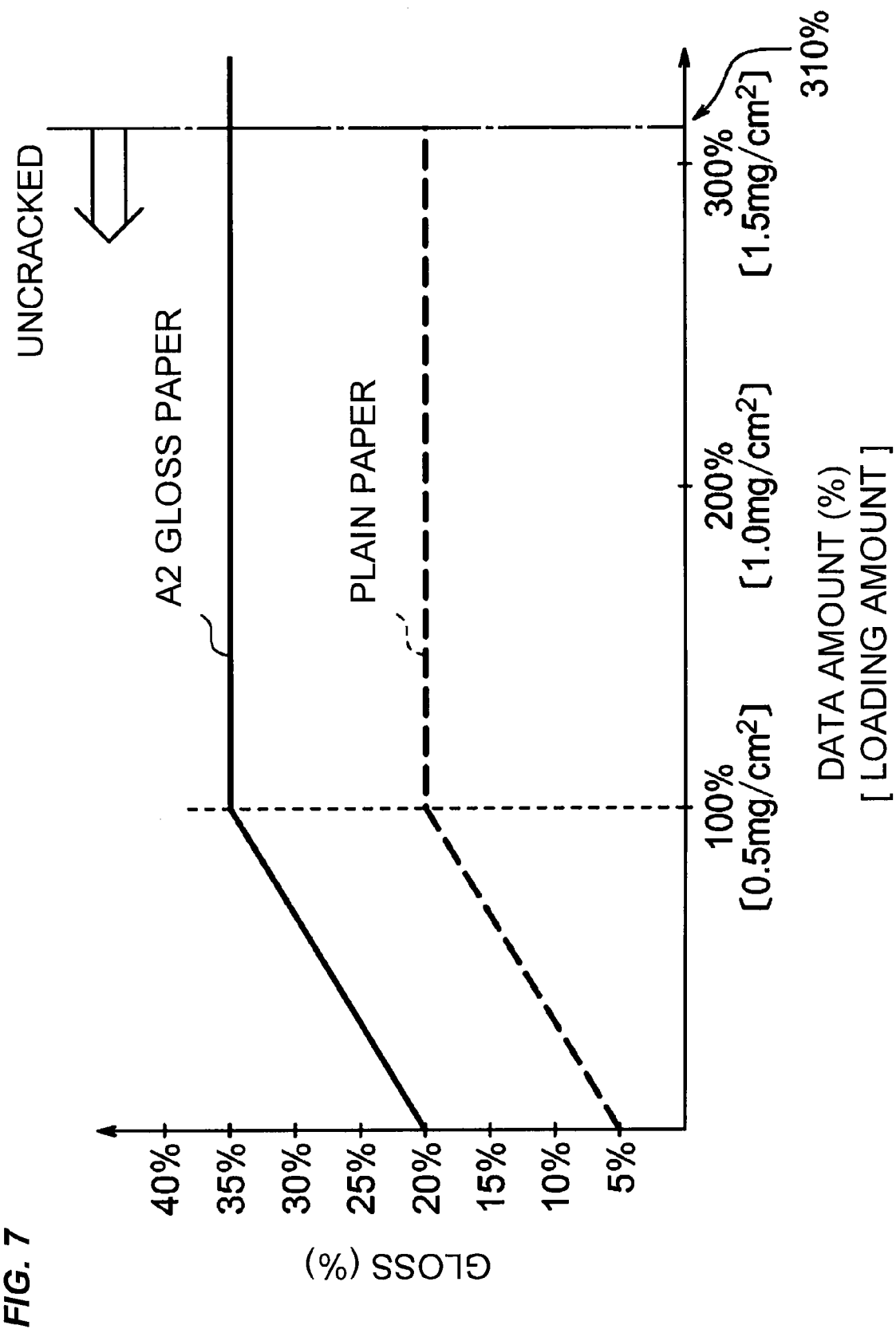
FIG. 7 is a diagram illustrating a relationship between a toner amount and a gloss when a toner image is fixed using a fixer of a high temperature separation system according to an embodiment of the present invention.

FIG. 7 is a graph illustrating a relationship between a "data amount", a "gloss", and "generation of a crack" in a middle gloss mode. The vertical axis indicates a gloss of a toner image and the horizontal axis indicates the data amount. Further, a numerical value in a parenthesis is the loading amount that corresponds to the data amount. The solid line indicates the case of using A2 gloss paper and the broken line indicates the case of using plain paper.

Even though any paper is used, a gloss increases as the data amount increases, until the data amount reaches 100%. The maximum value of the gloss is 35% in the A2 gloss paper and 20% in the plain paper. In addition, in this embodiment, even though the loading amounts of all color toners and a transparent toner reach 310% as a maximum value, the crack of the toner image is not generated in the middle gloss mode. In this experiment, an image is formed on the entire surface of the image forming area with the loading amounts of the transparent toner of 100% and the yellow, magenta, and cyan toners of 70%.

Figure 8:
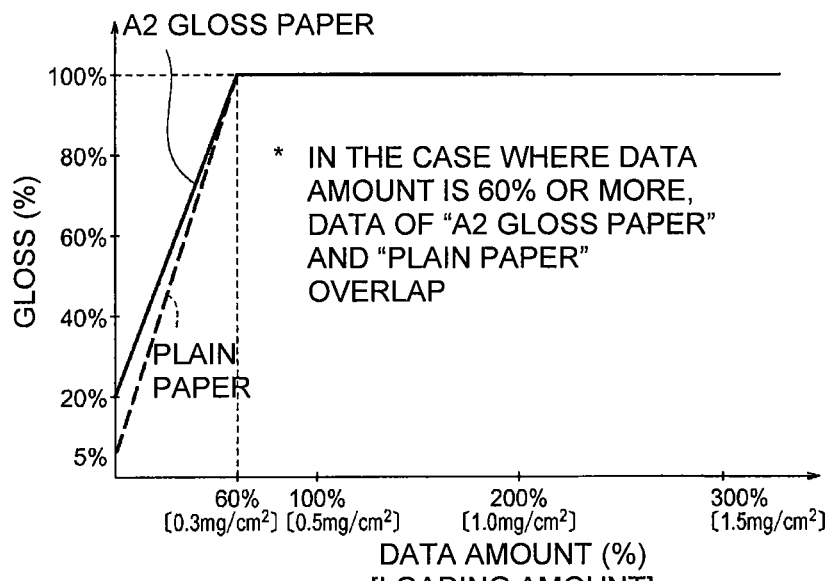
FIGS. 8A and 8B are diagrams illustrating a relationship between a toner amount and a gloss when a toner image is fixed using a fixer of a cooling separation system according to an embodiment of the present invention.

FIG. 8A is a graph illustrating a relationship between a "data amount" and a "gloss" in a high gloss mode. Similar to FIG. 7, the vertical axis indicates a gloss of a toner image and the horizontal axis indicates the data amount. Further, a numerical value in a parenthesis is the loading amount that corresponds to the data amount. The solid line indicates the case of using A2 gloss paper and the broken line indicates the case of using plain paper. Even though any paper is used, a gloss increases as the data amount increases. However, if the data amount reaches 60%, the variation in the gloss is not viewed. The maximum value of the gloss is 100 in the A2 gloss paper and the plain paper. Further, if the data amount increases and exceeds 270%, the crack is generated in the A2 gloss coat paper (hereinafter, referred to as gloss paper). FIG. 8B is a table illustrating a relationship between a data amount and generation of a crack. The crack of the A2 gloss paper when the data amount is 270% is generated at the level which can be recognized if an angle of a light source that illuminates a toner surface is adjusted (shown by "A" in FIG. 8B). Further, if the data amount exceeds 280%, the crack is generated to the level which can be recognized without depending on the angle of the light source (shown by "x" in FIG. 8B). Meanwhile, if the plain paper is used, the crack is not generated in the data amount of 270%. When the data amount becomes 280%, the crack is generated to the level which can be recognized if the angle of the light source is adjusted. Further, in the data amount of 290%, the crack is generated to the level which can be recognized without depending on the angle of the light source. Further, when the crack cannot be viewed, this is shown by "○" in FIG. 8B.

The generation level of the crack is varied in accordance with the kind of the used fixing device or recording material P. This reason is as follows. If the recording material is heated, moisture is evaporated and contracted. Further, if the recording material is cooled down after being heated, the recording material absorbs moisture and is expanded. Meanwhile, if a toner is heated, viscosity of the toner is lowered and the toner is expanded. Further, if the toner is cooled down, the toner is contracted while being solidified. Accordingly, if the recording material P passes through the first fixing nip portion N1, in the fixer F1 that serves as the fixing device where the recording material P is separated, since the toner where the viscosity is lowered is gradually solidified along the expanded recording material P, the crack is rarely generated in the toner image in the middle gloss mode. Meanwhile, in the high gloss mode, since the toner that is heated by the second fixing nip portion N2 of the second fixer F2 is rapidly cooled down, the recording material is solidified in a state where strong stress remains in the toner. Thereafter, due to the expansion of the recording material, the crack is generated in the toner image. The reason why the crack is easily generated in the A2 gloss paper is because force that is generated when the A2 gloss paper is expanded is stronger than force in the plain paper.

Based on the above result, in this embodiment, when the "middle gloss mode" is selected, the transparent toner is uniformly loaded to the entire surface of the image forming area with the loading amount of 0.5 mg/cm$^2$. Further, when the "high gloss mode" is selected, the transparent toner is uniformly loaded to the entire surface of the image forming area with the loading amount of 0.3 mg/cm$^2$.

The specific example will be described. When the "middle gloss mode" is selected, the controller K transmits the electrical image information having the data amount of 100%, which is stored in the memory G and used to form an image on the entire image forming area using the transparent toner having the loading amount of 0.5 mg/cm$^2$, to the transparent image forming device. Further, when the "high gloss mode" is selected, the controller K may transmit the electrical image information having the data amount of 60%, which is stored in the memory G and used to form an image on the entire image forming area using the transparent toner having the loading amount of 0.3 mg/cm$^2$, to the transparent image forming device. When the "middle gloss mode" is selected, the controller K serving as the controller may transmit the electrical image information having the data amount of 100%, which is stored in the memory G and used to form an image on the entire image forming area using the transparent toner having the loading amount of 0.5 mg/cm$^2$, to the transparent image forming device. In addition, when the "high gloss mode" is selected, the controller K may convert the electrical image forming information into the electrical image information having the data amount of 60%, which is stored in the memory G and used to form an image on the entire image forming area using the transparent toner having the loading amount of 0.3 mg/cm$^2$, and transmit the electrical image information to the transparent image forming device.

As the result object, in addition to the result object like the above-described entire surface photo, this embodiment may be used in the case in which the transparent toner is loaded to a specific area such as a photo or an illustration with a design where the text and the photo are mixed to have a high gloss. This technique is disclosed in Japanese Patent Application Laid-Open NO. 05-265287. Of course, marks indicating characters such as "SAMPLE" may be formed by the transparent toner and overlapped to the toner image formed by each toner.

For example, when the marks indicating characters such as "SAMPLE" may be formed by the transparent toner, the controller K that serves as the controller acquires an area where the transparent toner image is formed. Specifically, the controller K acquires the electrical image information in which the area where the transparent toner image is formed is "0" by binary expression and the area where the transparent toner image is not formed is "1" by binary expression. In the case of the "middle gloss mode", the controller K controls the transparent image forming device, such that the transparent toner having the loading amount of 0.5 mg/cm$^2$ is loaded to the area where the value of the electrical image information is "1". In the case of the "high gloss mode", the controller K controls the transparent image forming device, such that the transparent toner having the loading amount of 0.3 mg/cm$^2$ is loaded to the area where the value of the electrical image information is "1".

As such, the controller K may control the image forming device based on the electrical image information input from the external host device 1000 or the image reading portion A, in addition to the data that is stored in the memory G and used to uniformly form a transparent toner image on the entire surface of the image forming area. Further, the input electrical image information may be considered as a value other than the binary value. When the input electrical image information is expressed with a percentage, the controller K may control the transparent image forming device as follows. In the case of the "middle gloss mode", the controller K controls the transparent image forming device, such that the transparent toner of the amount designated by the input electrical image information is loaded to the designated area. Further, in the case of the "high gloss mode", the controller K controls the transparent image forming device, such that the amount of the transparent toner loaded to the area where the amount designated by the input electrical image information exceeds "0.3 mg/cm$^2$" becomes "0.3 mg/cm$^2$". That is, when "100%" as the percentage value is input, the controller K controls the image forming device such that the amount becomes "0.5 mg/cm$^2$". Here, in the case of the "high gloss mode", the controller K converts the value of the input electrical image information into "60%", when the value of the input electrical image information exceeds "60%". The controller K can change the loading amount of the transparent toner formed on the recording material by converting the input electrical image information. For example, if the controller K changes a charged potential of the photosensitive drum, the controller K can change the amount of the transparent toner per unit area loaded on the recording material. That is, the controller (controller) K controls each image forming station serving as the image forming device, such that the amount of the transparent toner per unit area on the recording material in the "high gloss mode" (first image forming mode) becomes smaller than the amount of the transparent toner per unit area on the recording material in the "middle gloss mode" (second image forming mode). In the "high gloss mode", an image is formed using the fixer (glossing device) F2. In the "middle gloss mode", an image is formed using the fixer (fixing device) F1 without using the fixer F2.

In order to simplify the following description, the case of using the electrical image information that is stored in the memory G and used to form a transparent toner image of the uniform loading amount on an image forming area of the recording material P will be described. In this specification, it is assumed that the uniform loading amount is in a range of ±0.08 mg/cm$^2$.

(11) Relationship Between a Temperature of a Separation Portion S2 of a Fixer F2 of a Cooling Separation System and a Gloss In this case, the relationship between the temperature of the separation portion S2 of the fixer F2 serving as the glossing device and the gloss will be described.

In the second fixer F2, in order to solidify a toner image along the shape of the surface of the fixing belt 157, the toner image that is softened by heating is cooled down and separated from the fixing belt 157. Further, it is known that the toner is further softened as the temperature of the toner becomes higher than the temperature of the unique, glass transition temperature Tg of the toner.

Figure 11:
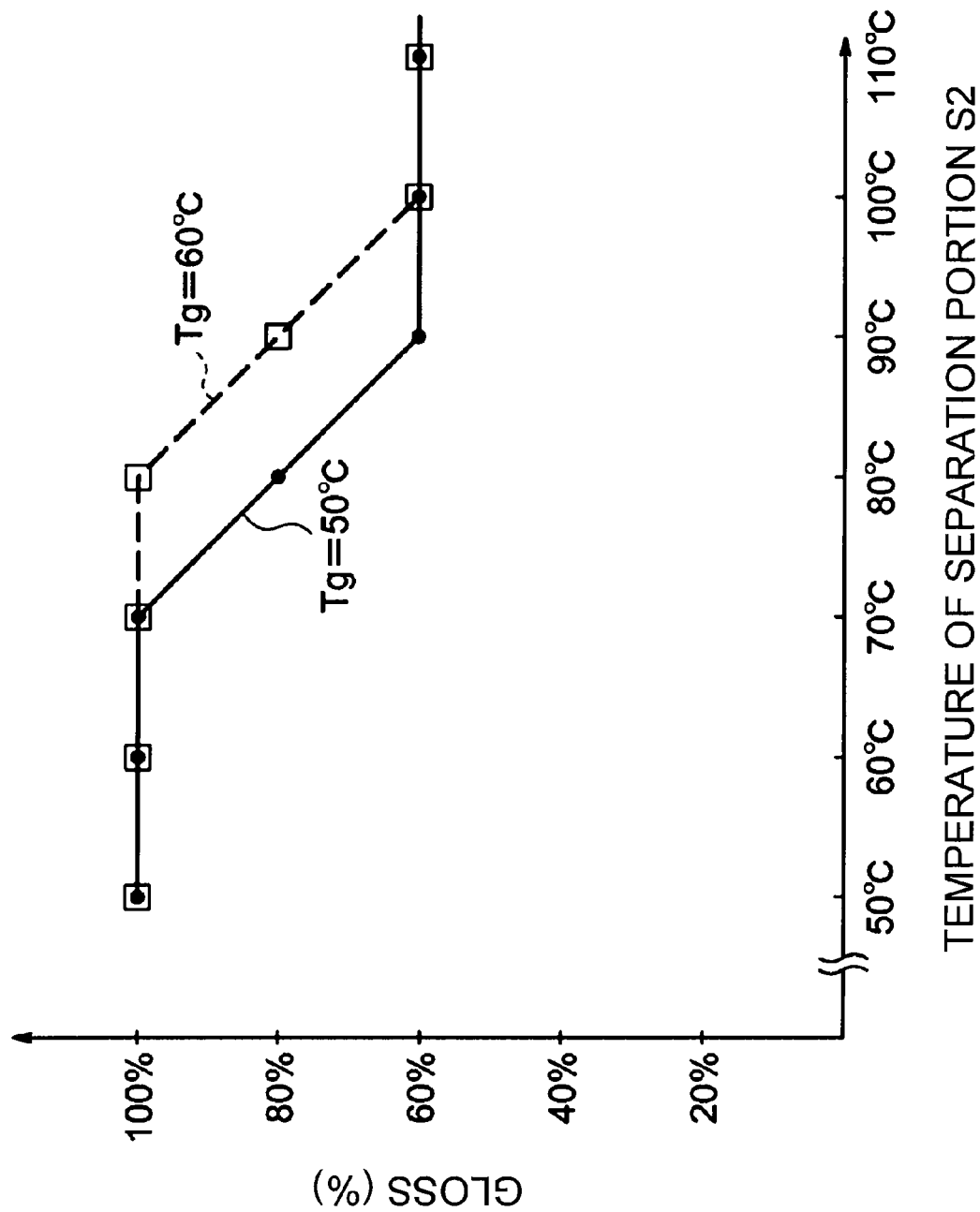
FIG. 11 is a diagram illustrating a relationship between a temperature of a second separation portion according to an embodiment of the present invention and a gloss of a toner image after heating.

A solid line of FIG. 11 shows a relationship between the temperature of the second separation portion S2 when a toner image of the loading amount of 0.3 mg/cm² is formed on A2 gloss paper using a toner of which the temperature of the glass transition temperature Tg is at 50° C. and heated using the fixer F2 of the cooling separation system in this embodiment, and the gloss of the toner image after heating. The temperature of the separation portion S2 is adjusted by changing the rotation speed of the cooling fan 156.

When the temperature of the second separation portion S2 is 70° C. or less (temperature that is 20° C. higher than the temperature of the glass transition temperature Tg), the gloss becomes 100%, and the toner image is consolidated along the surface of the fixing belt 157. Meanwhile, if the temperature of the second separation portion S2 exceeds 70° C., the toner image is extraordinarily softened, when the toner image is separated from the fixing belt 157. For this reason, in the toner image, the gloss is lowered without depending on the shape of the surface of the fixing belt 157.

A broken line of FIG. 11 shows a result that is obtained by testing a relationship between the temperature of the second separation portion S2 and the gloss of the toner image, using a toner of which the temperature of the glass transition temperature Tg is at 60° C. Except that the toner is different, the test is performed under the same conditions as the test using the toner of which the temperature of the glass transition temperature Tg is 50° C. Even in the case of using the toner where the temperature of the glass transition temperature Tg is 60° C., if the temperature of the second separation portion S2 is lower than the temperature that is 20° C. higher than the temperature of the glass transition temperature Tg, that is, 80° C., the gloss becomes 100%.

From the above result, in this embodiment using the toner of which the temperature of the glass transition temperature Tg is 50° C., if the temperature of the second separation portion S2 is set to the temperature 20° C. higher than the temperature of the glass transition temperature Tg, that is, 70° C. or less, it is possible to solidify the toner image along the shape of the surface of the fixing belt 157. As a result, it is possible to obtain the high gloss.

(12) Flowchart of a Middle Gloss Mode, a High Gloss Mode, and a Four Color Mode

Figure 10:
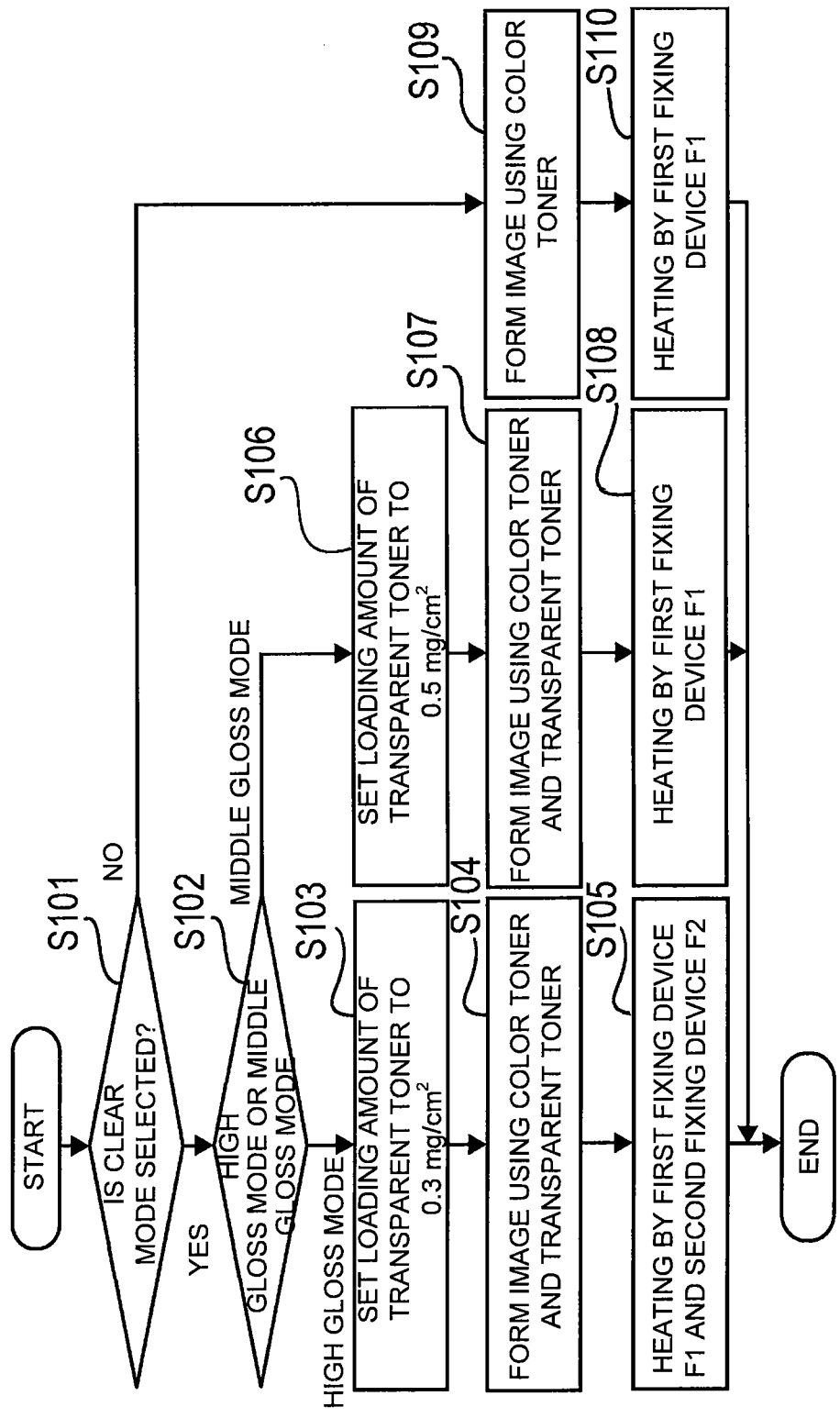
FIG. 10 is a flowchart illustrating the operation of an image forming apparatus according to an embodiment of the present invention.

FIG. 10 is a flowchart illustrating an operation sequence of an image forming apparatus. The image forming apparatus operates in accordance with the middle gloss mode, the high gloss mode, and the four color mode that are selected by a user. The operation of the image forming apparatus will be described below.

The middle gloss mode is a mode where the color toner image and the transparent toner image are formed on the recording material and are fixed using the fixer F1 of the high temperature separation system serving as the fixing device. Further, the high gloss mode is a mode where the color toner image and the transparent toner image are formed on the recording material and are fixed using the second fixer F2 after being fixed using the fixer F1 of the high temperature separation system. The four color mode is a mode where the color toner image is formed on the recording material and is fixed using the fixer F1 serving as the fixing device. After the mode setting is simply described, each step will be described.

When the "four color mode" is set, a user selects a key 420 of the operation panel B. When the "clear mode" is set, the user selects a key 410 of the operation panel B. In this embodiment, the "clear mode" includes the "middle gloss mode" and the "high gloss mode". In the "high gloss mode", it is possible to obtain an image having a high gloss of about 100% on the entire surface of the image forming area. In the "middle gloss mode", it is possible to obtain an image having a gloss of about 35% on the entire surface of the image forming area. If the "clear mode" is selected, the image forming apparatus selectably displays the "high gloss mode" and the "middle gloss mode" on a display portion of the operation panel B (refer to FIG. 9). When the user desires to set the "middle gloss mode", the user selects the key 411, and when the user desires to set the "high gloss mode", the user selects the key 412. Thereby, the image forming apparatus can obtain the mode that is selected by the user. Subsequently, each step will be described in detail.

Step S101 is a step in which an operation is switched in accordance with the mode set by the user. When the mode set by the user is the clear mode, the image forming apparatus executes a process of Step S102. Further, when the mode set by the user is the four color mode, the image forming apparatus executes a process of Step S109.

Step S102 is a step in which an operation is switched in accordance with the "high gloss mode" or the "middle gloss mode" set by the user. In the case of the "high gloss mode", the image forming apparatus executes a process of Step S103. Further, in the case of the "middle gloss mode", the image forming apparatus executes a process of Step S106.

The processes of Steps S103 to S105 are executed when the "high gloss mode" is selected. In the "high gloss mode", the image forming apparatus fixes the toner image using the fixer F1 of the high temperature separation system and the fixer F2 of the cooling separation system. When the image is fixed using the fixer of the cooling separation system, the crack may be easily generated in the surface of the image. For this reason, in order to suppress the generation of the crack, the controller K that serves as the controller controls the transparent image forming device, such that the loading amount of the transparent toner image becomes 0.3 mg/cm² (S103). At this time, the controller K may convert the value of the electrical image information as described above and change the charged potential of the photosensitive drum of the image forming station Pe.

In the image forming stations Pa to Pe, the yellow, magenta, cyan, black, and transparent toner images are formed on the recording material P. At this time, the transparent toner image is formed over the entire surface of the image forming area of the recording material P with the uniform loading amount (S104).

Then, the recording material P where the toner image is formed is heated by the fixer F1 of the high temperature separation system that serves as the fixing device and glossed by the fixer F2 of the cooling separation system that serves as the glossing device, and the image formation is completed (S105).

The processes of Steps S106 to S108 are executed when the "middle gloss mode" is selected. In the "middle gloss mode", the image forming apparatus fixes the toner image using the fixer F1 of the high temperature separation system. In the "middle gloss mode", the fixer F2 of the cooling separation system is not used. For this reason, as compared with the "high gloss mode", it is difficult for the crack to be generated in the surface of the image. Accordingly, the controller K that serves as the controller controls the transparent image forming device, such that the loading amount of the transparent toner image becomes 0.5 mg/cm² (S106).

In the image forming stations Pa to Pe, the yellow, magenta, cyan, black, and transparent toner images are formed on the recording material P. At this time, the transparent toner image is formed over the entire surface of the image forming area of the recording material P with the uniform loading amount (S107).

Then, the recording material P where the toner image is formed is heated by the fixer F1 that serves as the fixing device, and the image formation is completed (S108).

The processes of Steps S109 and S110 are executed when the "four color mode" is selected. In the "four color mode", in the image forming stations Pa to Pe, the yellow, magenta, cyan, and black toner images are formed on the recording material P (S109). The recording material P where the toner image is formed is heated by the fixer F1 that serves as the fixing device, and the image formation is completed (S110).

As such, the controller K controls each image forming station, such that the amount of the transparent toner per unit area on the recording material in the "high gloss mode" where an image is formed using the fixer F2 of the cooling separation system becomes smaller than the amount of the transparent toner per unit area on the recording material in the "middle gloss mode" where an image is formed using the fixer F1 of the high temperature separation system without using the fixer F2 of the cooling separation system.

As described above, the loading amount of the transparent toner image in the "high gloss mode" where the fixer F2 of the cooling separation system is used becomes smaller than the loading amount of the transparent toner image in the "middle gloss mode" where the fixer F2 of the cooling separation system is not used. As a result, it is possible to alleviate the generation of the crack in the toner image that is formed in the "high gloss mode".

Second Embodiment

Next, an image forming system according to a second embodiment of the present invention will be described with reference to the accompanying drawings. The same portions as the portions according to the above-described first embodiment are denoted by the same reference numerals and the description thereof will be omitted.

Figure 12:
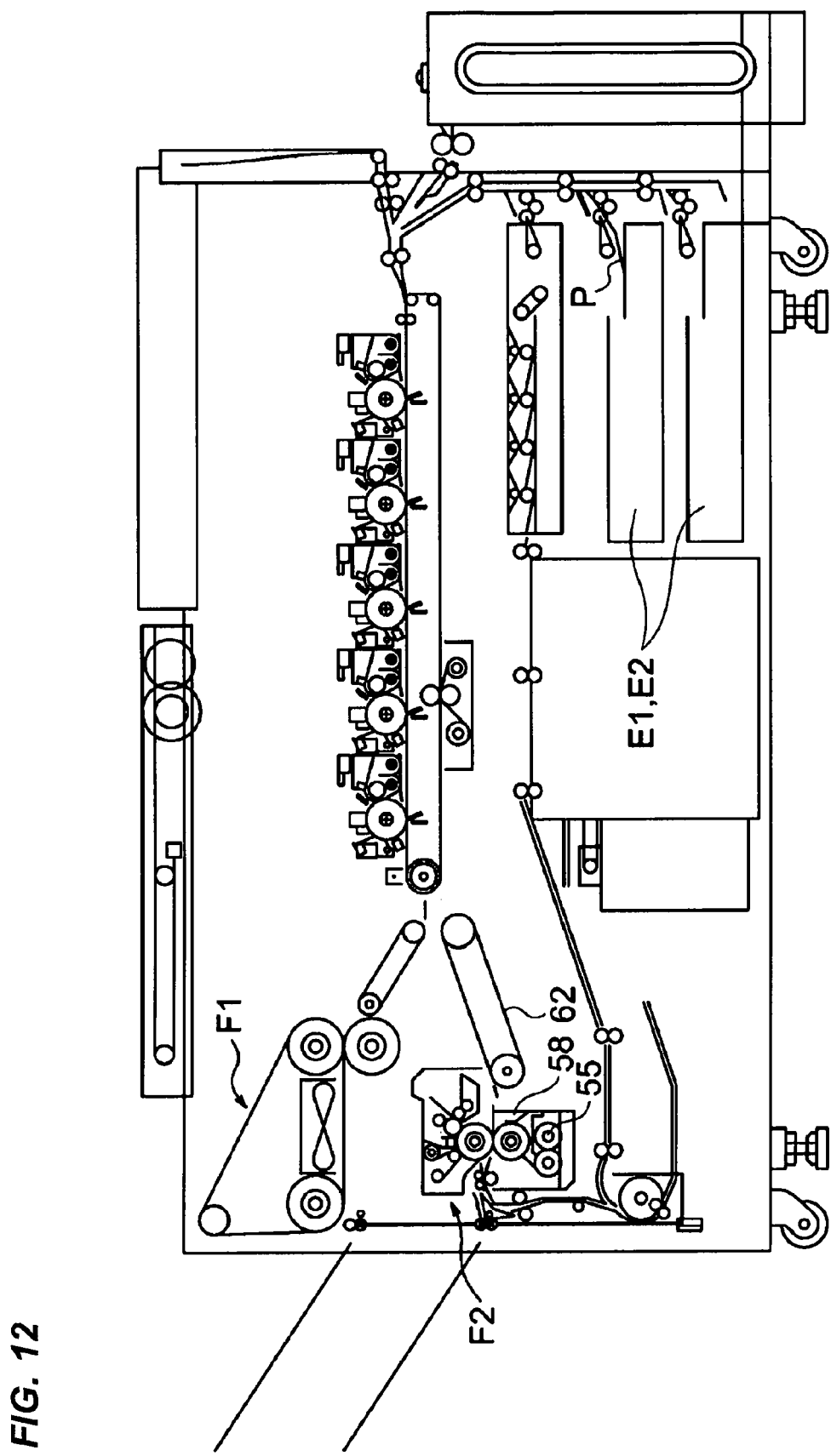
FIG. 12 is a diagram illustrating the schematic configuration of an image forming apparatus according to an embodiment of the present invention.

FIG. 12 is a schematic diagram illustrating an image forming system according to this embodiment. As shown in FIG. 12, in this embodiment, the fixer F1 of the high temperature separation system that is used in the above-described first embodiment functions as the first fixer. Further, the fixer F2 of the cooling separation system that serves as the glossing device functions as the second fixer. The image forming system according to this embodiment has the configuration where the fixer F1 and the fixer F2 are vertically disposed in the apparatus body 100.

Even in this embodiment, if the middle gloss mode is set by the operation panel B, the controller K that functions as the controller controls the transparent image forming device, such that the loading amount of the transparent toner becomes 0.5 mg/cm$^2$. If the high gloss mode is set by the operation panel B, the controller K that functions as the controller controls the transparent image forming device, such that the loading amount of the transparent toner becomes 0.3 mg/cm$^2$.

In this embodiment, when the "high gloss mode" is selected, the fixer F1 that serves as first fixing device is not used. However, in regards to the "data amount", the "gloss", and the "generation of the crack", the same test result as the test result in the first embodiment is obtained.

Figure 13:
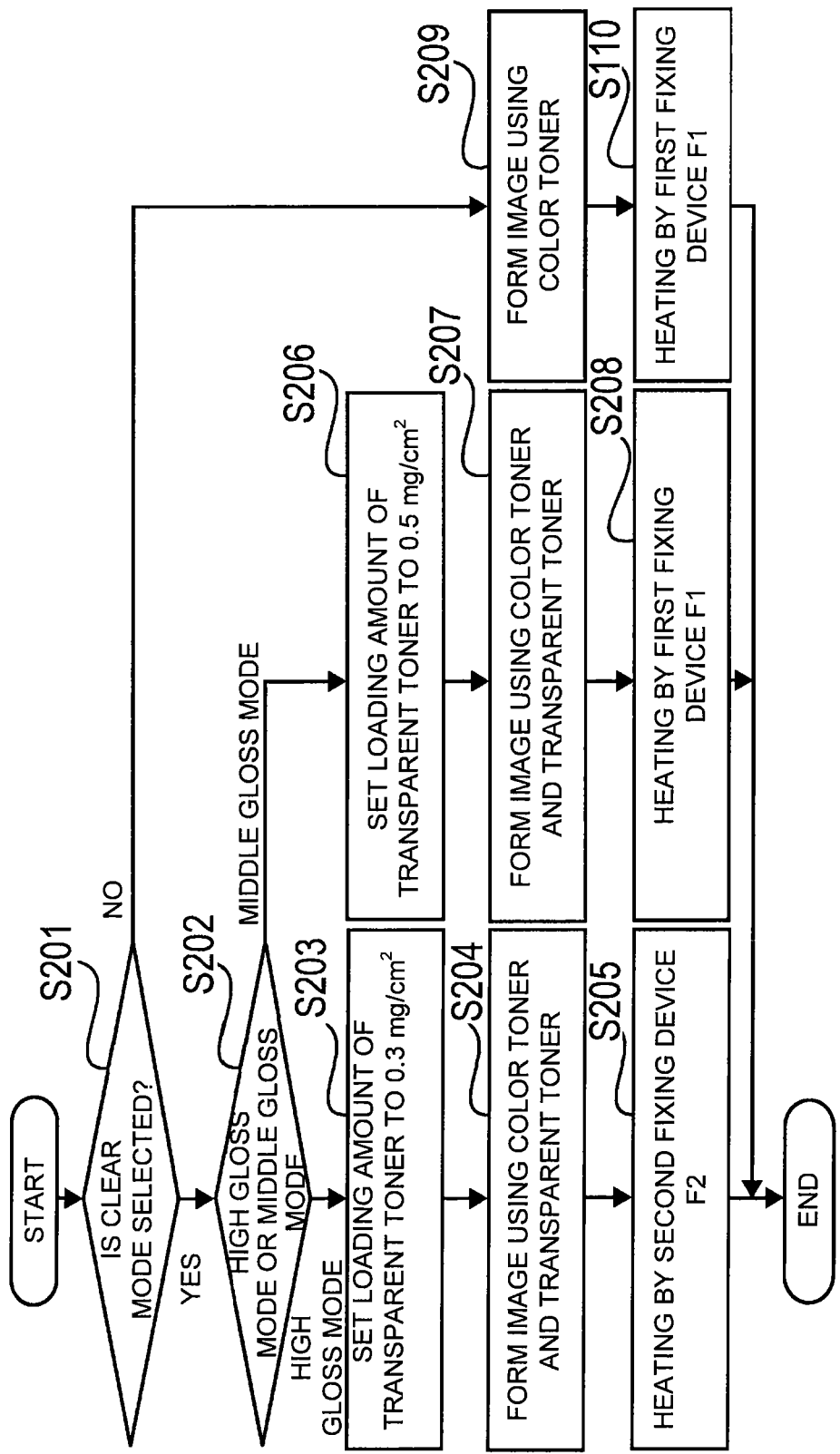
FIG. 13 is a flowchart illustrating the image forming operation according to an embodiment of the present invention.

FIG. 13 is a flowchart illustrating image formation in each mode and a separation of a fixer F1 of a high temperature separation system serving as the first fixing device and a fixer F2 of a cooling separation system serving as second fixing device in this embodiment.

Similar to the image forming system according to the first embodiment, even in the image forming system according to this embodiment, the modes can be selected by the operation panel B shown in FIG. 4.

Step S201 is a step in which an operation is switched in accordance with the mode set by the user. When the mode that is set by the user is the clear mode, the image forming apparatus executes a process of Step S202. Further, when the mode that is set by the user is the four color mode, the image forming apparatus executes a process of Step S209.

Step S202 is a step in which an operation is switched in accordance with the "high gloss mode" or the "middle gloss mode" set by the user. In the case of the "high gloss mode", the image forming apparatus executes a process of Step S203. Further, in the case of the "middle gloss mode", the image forming apparatus executes a process of Step S206.

The processes of Steps S203 to S205 are executed when the "high gloss mode" is selected. In the "high gloss mode", the image forming apparatus fixes the toner image using the fixer F2 that serves as the second fixing device. When the image is fixed using the fixer F2 of the cooling separation system, the crack may be easily generated in the surface of the image. For this reason, in order to suppress the generation of the crack, the controller K that serves as the controller controls the transparent image forming device such that the loading amount of the transparent toner image becomes 0.3 mg/cm$^2$ (S203). In the image forming stations Pa to Pe, the yellow, magenta, cyan, black, and transparent toner images are formed on the recording material P. At this time, the transparent toner image is formed over the entire surface of the image forming area of the recording material P with the uniform loading amount (S204). Then, the recording material P where the toner image is formed is heated by the second fixer F2 that serves as the second fixing device and the image formation is completed (S205).

The processes of Steps S206 to S208 are executed when the "middle gloss mode" is selected. In the "middle gloss mode", the image forming apparatus fixes the toner image using the fixer F1 of the high temperature separation system that serves as the first fixing device. In the middle gloss mode, the fixer F2 of the cooling separation system that serves as the second fixing device is not used. For this reason, as compared with the "high gloss mode", it is difficult for the crack to be generated in the surface of the image. Accordingly, the controller K that serves as the controller controls the transparent image forming device such that the loading amount of the transparent toner image becomes 0.5 mg/cm$^2$ (S206). In the image forming stations Pa to Pe, the yellow, magenta, cyan, black, and transparent toner images are formed on the recording material P. At this time, the transparent toner image is formed over the entire surface of the image forming area of the recording material P with the uniform loading amount (S207). Then, the recording material P where the toner image is formed is heated by the fixer F1 that serves as the first fixing device, and the image formation is completed (S208).

The processes of Steps S209 and S210 are executed when the "four color mode" is selected. In the "four color mode", in the image forming stations Pa to Pe, the yellow, magenta, cyan, and black toner images are formed on the recording material P (S209). The recording material P where the toner image is formed is heated by the fixer F1 that serves as the first fixing device, and the image formation is completed (S210).

As such, the controller K that serves as the controller controls each image forming station serving as the image forming device, such that the amount of the transparent toner per unit area on the recording material in the "high gloss mode" as the first image forming mode where an image is formed using the fixer F2 of the cooling separation system serving as the second fixing device without using the fixer F1 of the high temperature separation system serving as the first fixing device becomes smaller than the amount of the transparent toner per unit area on the recording material in the "low gloss mode" as the second image forming mode where an image is formed using the fixer F1 of the high temperature separation system serving as the first fixing device without using the fixer F2 of the cooling separation system serving as the second fixing device.

As described above, the loading amount of the transparent toner image in the "high gloss mode" where the fixer of the cooling separation system is used becomes smaller than the loading amount of the transparent toner image in the "middle gloss mode". As a result, even in the image forming system according to this embodiment, it is possible to alleviate the generation of the crack in the toner image that is formed in the "high gloss mode".

Third Embodiment

Next, an image forming system according to a third embodiment of the present invention will be described with reference to the accompanying drawings. The same portions as the portions according to the above-described first and second embodiments are denoted by the same reference numerals and the description thereof will be omitted.

When the "high gloss mode" where the fixer of the cooling separation system is used is selected, the loading amount of transparent toner on the recording material P is preferably reduced. In this case, as can be seen from a graph shown in FIG. 8, the loading amount of the toner where the crack starts to be generated is different depending on the kind of recording material. Specifically, the crack can be easily generated in the A2 gloss paper. The reason is because force generated when the A2 gloss paper is expanded is stronger than force in the plain paper. For this reason, in consideration of the kind of recording material, it is preferable to sufficiently reduce the loading amount of the transparent toner in order to suppress the generation of the crack. Accordingly, in this embodiment, the description is given to the configuration where the loading amount of the transparent toner is changed in accordance with the kind of the recording material where the toner image is formed, when the "high gloss mode" is selected. Further, the image forming apparatus uses the same configuration as the image forming apparatus according to the second embodiment.

Figure 14:
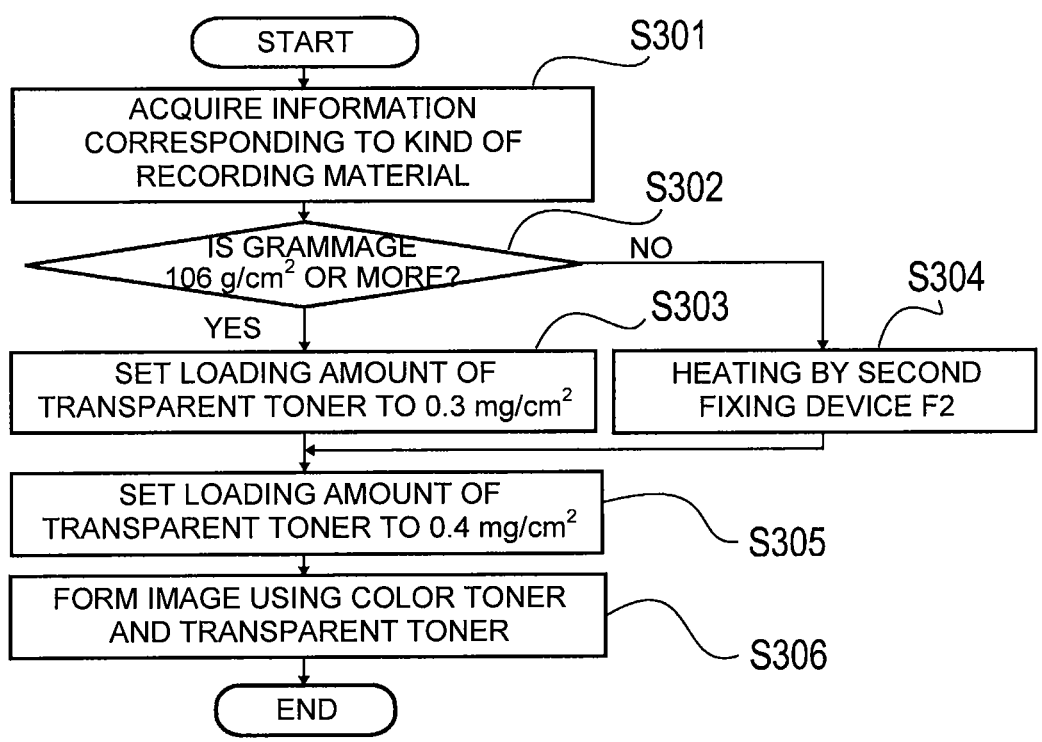
FIG. 14 is a flowchart illustrating the image forming operation according to an embodiment of the present invention.

Hereinafter, the operation in the case where the "high gloss mode" is selected will be described. FIG. 14 is a flowchart illustrating the operation of an image forming apparatus in the case where a "high gloss mode" is selected. Steps S301 to S306 that will be described below are executed, instead of Steps S103 to S105 shown in FIG. 10 or Steps S203 to S206 shown in FIG. 13.

Step 301 is a step in which the kind of the recording material where the toner image is formed is acquired. The image forming apparatus acquires the kind of the recording material that is set in a cassette or a manual sheet tray.

Step S302 is a step in which the operation is changed in accordance with the kind of the recording material acquired in Step S301. When the grammage of the recording material acquired in Step S301 is 106 g/cm$^2$ or more (this recording material is called thick paper in this embodiment), the image forming apparatus executes a process of Step S303. Further, when the grammage of the recording material is less than 106 g/cm$^2$ (this recording material is called thin paper in this embodiment), the image forming apparatus executes a process of Step S304.

Step S303 is a step that is executed when a recording material to form a toner image is thick paper (whose grammage is 106 g/cm$^2$ or more). This is because the crack is easily generated in the surface of the image as the thickness of the recording material increases (grammage increases). In Step S302, the operation is switched based on the grammage of the recording material. However, the toner amount where the crack is generated is different depending on a coat material coated on the surface of the recording material and the material of the recording material. For this reason, the operation is more preferably changed in accordance with the kind of the recording material. For example, regardless of the grammage, the loading amount of the transparent toner may be set to 0.3 mg/cm$^2$ in the case of the coat paper, and the loading amount of the transparent toner may be set to 0.4 mg/cm$^2$ in the case of the non-coat paper.

When the toner image formed on the thick paper is fixed using the fixer F2 of the cooling separation system, the crack is easily generated in the surface of the image, as compared with the case where the toner image formed on the thin paper is fixed. For this reason, in order to suppress the generation of the crack, the controller K that serves as the controller controls the transparent image forming device such that the loading amount of the transparent toner image becomes 0.3 mg/cm$^2$ (S303).

When the toner image formed on the thin paper is fixed using the fixer F2 of the cooling separation system, it is difficult for the crack to be generated in the surface of the image, as compared with the case where the toner image formed on the thick paper is fixed, but the crack is easily generated as compared with the case where the image is fixed using the fixer F1 of the high temperature separation system serving as the fixing device. For this reason, in order to suppress the generation of the crack, the controller K that serves as the controller controls the transparent image forming device such that the loading amount of the transparent toner image becomes 0.4 mg/cm$^2$ (S304).

In the image forming stations Pa to Pe, the yellow, magenta, cyan, black, and transparent toner images are formed on the recording material P. At this time, the transparent toner image is formed over the entire surface of the image forming area of the recording material P with the uniform loading amount and with the loading amount set by Step S303 or S304 (S305).

Then, the recording material P where the toner image is formed is heated by the fixer F2 of the cooling separation system and the image formation is completed (S306).

Further, in this embodiment, the controller K changes the amount of the transparent toner per unit area based on the grammage. However, the crack in the surface of the image is generated due to the "contraction of the recording material" by heating and the "expansion of the recording material" by cooling after heating, as described above. The expansion and contraction of the recording material are varied in accordance with various factors, such as the grammage, the thickness of the paper, and the coating of the surface of the recording material, as described above. For this reason, preferably, the controller K determines an upper limit of the amount of the transparent toner per unit area formed on the recording material, based on the "kind of the recording material (so-called brand)" where the toner image is formed. In this case, a table where the "kind of the recording material" and the corresponding upper limit of the transparent toner per unit area are collected is stored in the memory G. In addition, in the case of the "high gloss mode", the controller K controls the image forming device such that the transparent toner of the amount exceeding the upper limit corresponding to the kind of the recording material is not loaded to the recording material, without depending on the input electrical image information.

As such, if the loading amount of the transparent toner is changed in accordance with the kind of the recording material, it is possible to suppress the crack in the surface of the image.

Fourth Embodiment

In the first to third embodiments, the controller K of the image forming apparatus controls the amount of the transparent toner per unit area loaded to the recording material. However, the amount of the toner per unit area loaded to the recording material is not necessarily controlled by the controller of the image forming apparatus. That is, the controller may convert the image data that serves as the electrical image information input to the image forming apparatus. As a result, the image forming system can control the amount of the transparent toner per unit area formed on the recording material. Further, the image forming system according to this embodiment may have the same configuration as the image forming apparatus that is described in the second embodiment and shown in FIG. 12.

For this reason, in this embodiment, an example of when a personal computer (hereinafter, simply referred to as a PC) serving as an external device that is connected to the image forming apparatus converts the image data serving as the electrical image information will be described. In the PC, a program that executes a conversion of the image data (electrical image information) used to form the transparent toner image is installed in an HDD. The PC executes various processes in accordance with the installed program. As a result, it is possible to alleviate the generation of the crack in the surface of the image in the first to third embodiments. Hereinafter, the schematic configuration of the PC will be described.

[With Respect to the Hardware Configuration of a PC]

A PC 1000 is connected to an image forming apparatus 100 and constitutes an image forming system. In this embodiment, the PC and the image forming apparatus are connected to each other through an Ethernet I/F, such that they can communicate with each other. The PC is an external terminal that can transmit a printing command to the image forming apparatus. For this reason, another terminal that can transmit a printing command to an MFP may be used, instead of the PC. For example, a portable information terminal, such as a WS (Work Station) or a PDA (Personal Digital Assistant), may be used.

Figure 15:
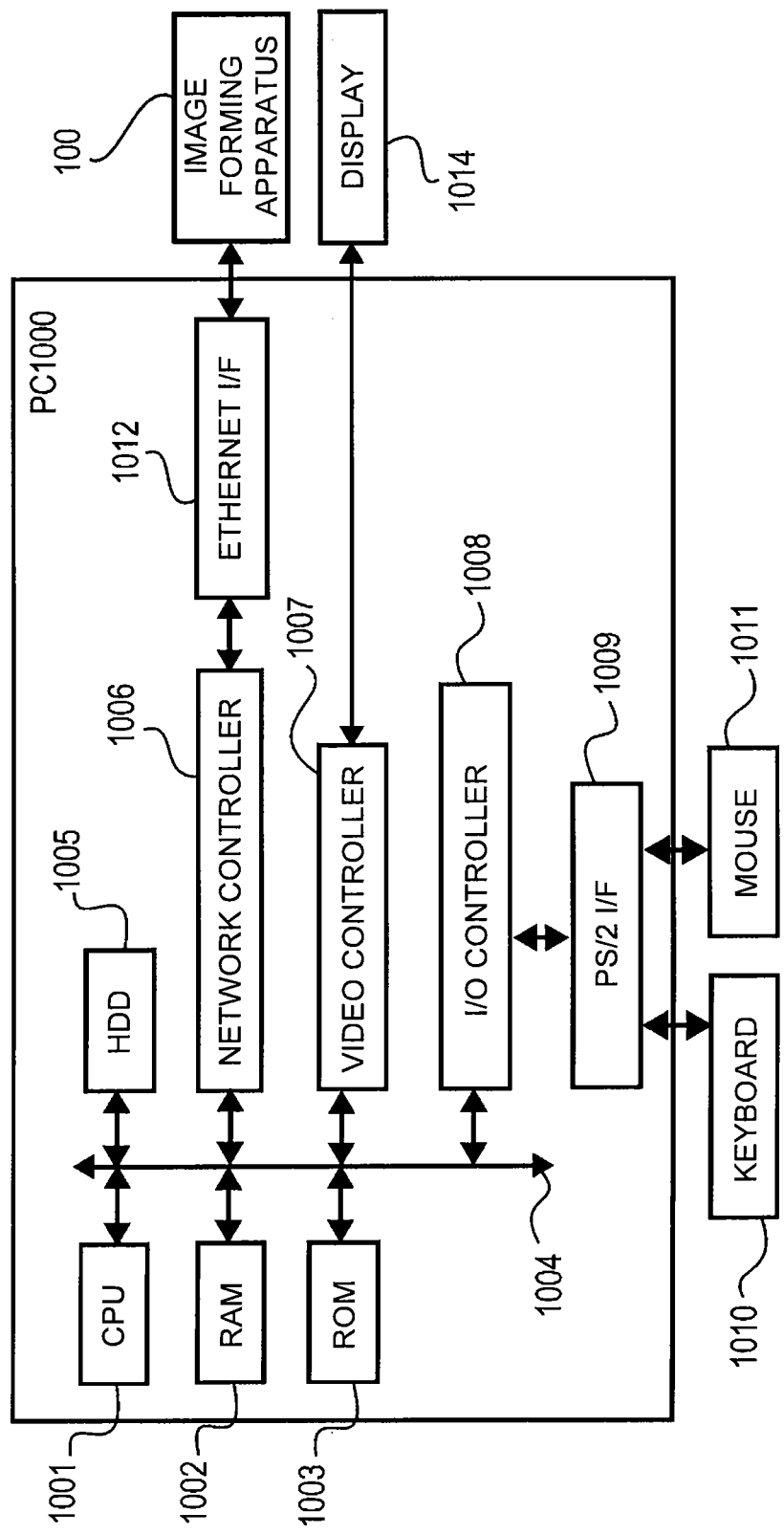
FIG. 15 is a block diagram illustrating the schematic configuration of a PC that functions as an external device according to an embodiment of the present invention.

FIG. 15 is a block diagram illustrating the hardware configuration of a PC 1000 that is an example of a PC serving as an information processing apparatus. Hereinafter, the hardware configuration of the PC 1000 will be described.

A CPU 1001 (Central Processing Unit), a RAM 1002 (Random Access Memory), and a ROM 1003 (Read Only Memory) are connected to a bus 1004. Further, an HDD 1005 (Hard Disk Drive), a network controller 1006, a video controller 1007, and an I/O controller 1008 are connected to the bus 1004. Various units that are connected to the bus can communicate with each other through the bus. The CPU 1001 develops a program, which is stored in the ROM 1003, to the RAM 1002, and executes the program. Further, the CPU 1001 transmits a control command to the HDD 1005, the network controller 1006, the video controller 1007, and the I/O controller 1008 through the bus 1004. Further, the CPU 1001 receives state signal and data such as image data from the HDD 1005, the network controller 1006, the video controller 1007, and the I/O controller 1008 through the bus 1004. In this way, the CPU 1001 can control the various units that constitute the PC 1000.

The PC 1000 is connected to the image forming system through the Ethernet I/F 1012. When the PC 1000 communicates with the image forming system through the Ethernet I/F 1012, a communication path is not limited to an inner portion of a LAN (Local Area Network), and may be a path through the Internet. A keyboard 1010 and a mouse 1011 serving as input devices are connected to the PC 1000 through a PS/2 I/F 1009. Further, a display 1014 serving as display means is connected to the PC 1000.

In this embodiment, the CPU 1001 controls a variety of hardware that constitutes the PC in accordance with an OS (Operation System) serving as basic software installed in the HDD. As a result, the user operates a GUI (Graphical User Interface) without recognizing the hardware constituting the PC, thereby executing a desired operation in the PC. Further, the user can transmit a printing command from an application program, which is executed on the OS and installed in the HDD, to the external image forming apparatus. When the printing command is transmitted to the image forming apparatus, a control method is different depending on the kind of the image forming apparatus. For this reason, the PC uses a driver program corresponding to the kind of the image forming system to create a control command according to the image forming system. The driver program that is installed in the HDD is incorporated in a portion of the OS. Therefore, the PC can create a control command according to a connected peripheral apparatus. In this embodiment, it is assumed that the driver program that is installed in the HDD executes a conversion of clear image data.

The hardware configuration of the PC in this embodiment has been described.

[Example of a Screen that is Displayed on a Display Connected to a PC]

Figure 16:
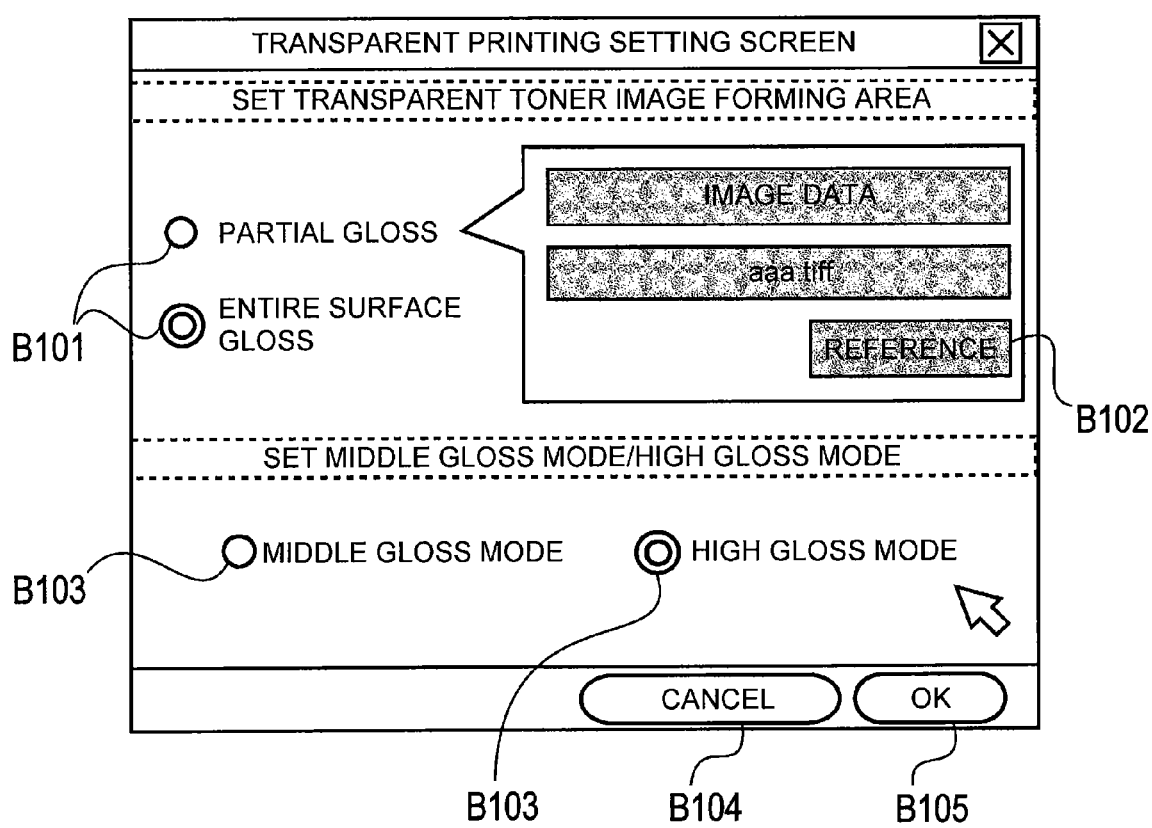
FIG. 16 is a diagram illustrating an example of a screen that a PC displays on a display in accordance with an embodiment of the present invention.

Hereinafter, an operation screen, which is displayed on a display 1014 connected to the PC 1000 when a printing command is transmitted from the PC to the image forming system, will be described. FIG. 16 is a diagram illustrating an example of a screen that a PC 1000 displays on a display 1014. A user can set various items displayed on a display using an input device, such as a mouse.

The user operates the PC 1000 and the image forming apparatus 100 sets image data that is used for printing. In a setting screen shown in FIG. 16, the user can select any one of the radio buttons B101 to designate an area where a transparent toner image is formed by the image forming apparatus. When the user selects "partial gloss", it is needed to designate a portion where the transparent toner image is formed. For this reason, when the user designates the "partial gloss", the user can select a key B102. If the user selects the key B102, the user can use the image data stored in the HDD 1005 of the PC 1000 to designate an area where the transparent toner image is formed.

Further, when the user selects "entire surface gloss", the user does not need to select the key B102. For this reason, the user becomes a selection disabled state. In the screen shown in FIG. 16, the "entire surface gloss" is selected, and the key B102 becomes a selection disabled state. When the user selects the "entire surface gloss", the CPU 1001 generates data that is needed to uniformly form the transparent toner image over the entire surface of an image forming area in the image forming apparatus. The setting that is related to the area where the transparent toner image is formed has been described. Next, a setting portion of the "clear mode" will be described. Similar to the first to third embodiments, the "clear mode" includes the "high gloss mode" and the "middle gloss mode". The "high gloss mode" that is displayed in FIG. 16 cannot be selected, when the fixer of the cooling separation system does not exist in the body of the image forming apparatus. The user can select any one of the radio buttons B103 to designate the "clear mode". In the screen shown in FIG. 16, the "high gloss mode" is selected. As such, the information that the user sets using the mouse is stored in the RAM 1002 serving as the information storage means by the CPU 1001 serving as the information processing means. The CPU 1001 serving as the display instructing means transmits a control signal to the video controller 1007 serving as the display controller such that the screen shown in FIG. 16 is displayed on the display 1014 serving as the display means. As a result, the user can set a variety of information by operating the various buttons of the screen selectably displayed on the display. The user presses an OK button B105 after setting the transparent printing setting information, thereby allowing the image forming apparatus to form the transparent toner image. As a result, the CPU 1001 that serves as the mode acquiring means can acquire the "clear mode" selected by the user. Further, if the user presses a cancel button B104, the previous setting is discarded.

[Description of the Operation of a PC Using a Flowchart]

Hereinafter, a sequence of when the PC 1000 executes an image process in accordance with a program (driver program) stored in the HDD 1005 will be described using a flowchart. When the clear image data and mode are set and the OK button B105 is pressed, the PC operates as follows. FIG. 17 is a flowchart illustrating a program that is executed by a PC. Hereinafter, each step will be described in detail.

Steps S401 and S402 are steps in which transparent printing setting information is acquired by displaying the screen shown in FIG. 17 on the display. The CPU 1001 allows the video controller 1007 to display the screen shown in FIG. 16 on the display 1014. Accordingly, the user can use the mouse 1011 or the keyboard 1010 to set the "clear mode" and "the area where the transparent toner image is formed". If the user presses the OK button B105, the CPU 1001 can acquire the "clear mode" and "the area where the transparent toner image is formed".

Step S403 is a step in which the process executed in accordance with the "clear mode" in Step S401 is changed. When the mode selected in Step S401 is the "high gloss mode", the CPU 1001 executes a process of Step S403. Further, when the mode selected in Step S401 is the "middle gloss mode", the CPU 1001 executes a process of Step S406.

Step S404 is a step that is executed when the "high gloss mode" is selected in Step S401. The CPU 1001 convert the pixel values of 60% or more among the pixel values of the data corresponding to the all pixels of the image data acquired in Step S401 into 60%. Further, when the "entire surface gloss" is acquired in Step S402, it is assumed that the CPU 1001 generates image data where all pixel values are 60%.

Step S405 is a step in which the image data converted or generated in Step S404 is stored in the RAM 1002. The CPU 1001 stores the image data converted or generated in Step S404 in the RAM 1002. At this time, in addition to the image data, additional information that is used to fix the toner image using the fixer F2 of the cooling separation system in the image forming apparatus is stored in the RAM 1002.

Step S406 is a step that is executed when the "middle gloss mode" is selected in Step S401. The CPU 1001 stores the image data acquired in Step S401 in the RAM 1002. Further, when the "entire surface gloss" is acquired in Step S402, it is assumed that the CPU 1001 generates image data where all pixel values are 100%. At this time, in addition to the image data, additional information that is used not to fix the toner image using the fixer F2 of the cooling separation system in the image forming apparatus is stored in the RAM 1002.

Step S407 is a step in which the image data and the additional information stored in the RAM 1002 in Step S405 or S406 are transmitted to the image forming apparatus. The CPU 1001 transmits the image data, which is stored in the RAM 1002, to the image forming apparatus 100 through the Ethernet I/F 1012. The image forming apparatus fixes the transparent toner image using the fixer according to the additional information, based on the received image data.

As such, when the "high gloss mode" is selected, a conversion is performed on the clear image data. As a result, it is possible to obtain the same effect as the effect of when the amount of the toner per unit area by the body of the image forming apparatus is controlled. Further, in this embodiment, it is possible to selectably execute the "high gloss mode" and the "middle gloss mode". Accordingly, it is possible to form an image in accordance with the intention of the user.

In this case, the process that is executed when the "high gloss mode" is selected may be the same as the process described in the first or third embodiment.

Further, a program that executes the characteristic process may be remotely supplied with respect to the information processing system or the information processing apparatus. Further, the information processing apparatus that is included in the information processing system may read a program code stored in an external information processing apparatus of the information processing system and execute the corresponding program.

That is, the program that is installed in the PC realizes the above-described process. Further, the form of the program is not limited as long as the PC executes the above-described process by using the program.

Examples of the recording medium that supplies the program may include a flexible disk, a hard disk, an optical disk, a magneto-optical disk, an MO, a CD-ROM, a CD-R, and a CD-RW. Further, examples of the recording medium may include a magnetic tape, a non-volatile memory card, a ROM, and a DVD (DVD-ROM and DVD-R).

The program may be downloaded from a homepage of the Internet using a browser. That is, a program itself or a file that is compressed and automatically installed may be downloaded from the corresponding homepage to a recording medium, such as a hard disk. Further, the program to execute the above-described process may be divided into a plurality of files constituting the program and these files may be downloaded from the different homepages, respectively. That is, a WWW server that enables a plurality of users to download the program files may become a constituent element.

Further, the program files may be distributed to the users after the program files are encrypted and stored in the recording medium, such as the CD-ROM. In this case, only the user who has cleared the predetermined condition may download cipher information from the homepage through the Internet, decrypt the encrypted program using the cipher information to execute the program, and install the program in the PC.

Further, the OS that is operated on the PC may execute a portion or all of the actual processes, based on the instruction of the program.

Further, the program that is read out from the recording medium may be written in a memory that is included in a functional extension board inserted into the PC or a functional extension unit connected to the PC. The CPU that is included in the functional extension board or the functional extension unit may execute a portion or all of the actual processes, based on the instruction of the program.

While the present invention has been described with reference to exemplary embodiments, it is to be understood that the invention is not limited to the disclosed exemplary embodiments. The scope of the following claims is to be accorded the broadest interpretation so as to encompass all such modification and equivalent structures and functions.

This application claims the benefits of Japanese Patent Application No. 2008-119506, filed May 1, 2008, and No. 2009-085227, filed Mar. 31, 2009, which are hereby incorporated by reference herein in their entirety.

What is claimed is:

1. An image forming system comprising:
an image forming device configured to form an image on a recording material using a color toner and a transparent toner;
a fixing device configured to fix the image formed by said image forming device onto the recording material;
a glossing device configured to increase a gloss of the image fixed on the recording material, said glossing device including an endless belt configured to convey the recording material so as to contact with the image fixed on the recording material, a heating device configured to heat the image on the recording material contacted with said endless belt and a cooling device configured to cool the image on the recording material heated by said heating device before the recording material is separated from said endless belt;
a controller which selectively executes a first image forming mode in which the image is formed using said fixing device and said glossing device and a second image forming mode in which the image is formed using said fixing device without using said glossing device, and controls said image forming device so that a maximum amount of the transparent toner per unit area on the recording material in the first image forming mode is smaller than the maximum amount of the transparent toner per unit area on the recording material in the second image forming mode.

2. The image forming system according to claim 1, wherein a gloss of said endless belt of which a surface contacts the image fixed to the recording material is in a range of 35 to 100%.

3. The image forming system according to claim 2, wherein, when the first image forming mode is selected, said controller controls said image forming device so that the transparent toner is formed on an entire area of an image formable area of the recording material so as to cover the color toner.

4. The image forming system according to claim 3, wherein said cooling device cools the image on the recording material so that a separating temperature of a portion of said endless belt where the recording material is separated from said endless belt in the first image forming mode is lower than a temperature 20° C. higher than a glass transition temperature of the transparent toner, and
wherein the separating temperature is lower than a separating temperature of a portion of said fixing device where the recording material is separated from said fixing device in the second image forming mode.

5. The image forming system according to claim 1, wherein said controller further controls the maximum amount of the transparent toner per unit area on the recording material in the first image forming mode based on a kind of the recording material.

6. An image forming system comprising:
an image forming device configured to form an image on a recording material using a color toner and a transparent toner;
a first fixing device configured to fix the image formed by said image forming device onto the recording material;
a second fixing device configured to fix the image formed by said image forming device onto the recording material so that a gloss of the image on the recording material fixed by said second fixing device is higher than a gloss of the image on the recording material fixed by said first fixing device, said second fixing device including an endless belt configured to convey the recording material so as to contact with the image on the recording material, a heating device configured to heat the image on the recording material contacted with said endless belt and a cooling device configured to cool the image on the recording material heated by said heating device before the recording material is separated from said endless belt;
a controller which selectively executes a first image forming mode in which the image is formed using said first fixing device and said second fixing device and a second image forming mode in which the image is formed using said first fixing device without using said second fixing device, and controls said image forming device so that a maximum amount of the transparent toner per unit area on the recording material in the first image forming mode is smaller than the maximum amount of the transparent toner per unit area on the recording material in the second image forming mode.

7. The image forming system according to claim 6, wherein a gloss of said endless belt of which a surface contacts the image fixed to the recording material is in a range of 35 to 100%.

8. The image forming system according to claim 7, wherein, when the first image forming mode is selected, said controller controls said image forming device so that the transparent toner is formed on an entire area of an image formable area of the recording material so as to cover the color toner.

9. The image forming system according to claim 8, wherein said cooling device cools the image on the recording material so that a separating temperature of a portion of said endless belt where the recording material is separated from said endless belt in the first image forming mode is lower than a temperature 20° C. higher than a glass transition temperature of the transparent toner, and
wherein the separating temperature is lower than a separating temperature of a portion of said first fixing device where the recording material is separated from said first fixing device in the second image forming mode.

10. The image forming system according to claim 6, wherein said controller further controls the maximum amount of the transparent toner per unit area on the recording material in the first image forming mode based on a kind of the recording material.

* * * * *